(12) United States Patent
Dyer

(10) Patent No.: US 8,419,898 B2
(45) Date of Patent: *Apr. 16, 2013

(54) WET STRENGTH RESINS DERIVED FROM RENEWABLE RESOURCES

(75) Inventor: John Collins Dyer, Evendale, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/351,546

(22) Filed: Jan. 17, 2012

(65) Prior Publication Data

US 2012/0199299 A1    Aug. 9, 2012

Related U.S. Application Data

(63) Continuation-in-part of application No. 13/020,158, filed on Feb. 3, 2011, now Pat. No. 8,241,461.

(51) Int. Cl.
*D21F 11/00*    (2006.01)

(52) U.S. Cl.
USPC .......................................................... 162/123

(58) Field of Classification Search .............. 162/123, 162/164.6, 168.2, 158, 164.1; 524/608, 606, 524/538, 539; 528/480; 526/264, 258, 304
See application file for complete search history.

(56) References Cited

U.S. PATENT DOCUMENTS

| 6,171,440 | B1 | 1/2001 | Staib |
| 6,211,357 | B1 | 4/2001 | Owens et al. |
| 6,306,464 | B2 | 10/2001 | Owens et al. |
| 6,355,137 | B1 | 3/2002 | Staib |
| 2001/0005529 | A1 | 6/2001 | Owens et al. |

*Primary Examiner* — Mark Halpern
(74) *Attorney, Agent, or Firm* — C. Brant Cook

(57) ABSTRACT

The present invention relates to cationic polymers, such as polyaminoamide epichlorohydrin (PAE), that are derived from renewable resources and can be used to produce wet strength resins suitable for a variety of applications, such as in absorbent paper articles.

24 Claims, No Drawings

WET STRENGTH RESINS DERIVED FROM RENEWABLE RESOURCES

CROSS REFERENCE TO RELATED APPLICATION

The present application is a continuation-in-part application of U.S. application Ser. No. 13/020,158 filed Feb. 3, 2011 now U.S. Pat. No. 8,241,461.

FIELD OF THE INVENTION

The present invention relates to cationic polymers (e.g., polyaminoamide epichlorohydrin resins) that are derived from renewable resources and can be used to produce resins suitable for a variety of applications, such as wet strength additives in absorbent paper articles.

BACKGROUND OF THE INVENTION

The use of disposable products made from webs of paper, such as paper towels, facial tissues, and sanitary tissues, is pervasive in modern industrialized societies. These products must exhibit certain physical characteristics, such as strength, softness, and absorbency. Strength is the ability of a paper to retain its physical integrity during use. Softness is the pleasing tactile sensation the user perceives when contacting or crumpling the paper. Absorbency is the characteristic of the paper that allows it to take up and retain certain fluids, particularly water, aqueous solutions, and aqueous suspensions. Absorbency encompasses the absolute quantity of fluid a given amount of paper will hold, the rate at which the paper will absorb the fluid and, when the paper is formed into an article (e.g., towel, wipe), the ability of the paper to cause a fluid to preferentially be taken up into the paper and leave a wiped surface dry.

The wet strength of paper can be increased through the incorporation of an additive that both adheres to the pulp, and forms a network that represses swelling of cellulose fibers, inhibiting the separation of fiber-fiber contacts when paper is rewetted. These wet strength additives are typically water soluble, cationic polymers that can form crosslinked networks with themselves or with cellulose. The earliest cationic wet strength resins were condensation products of urea and formaldehyde with small amounts of polyamines.

Polyaminoamide epichlorohydrin (PAE) resins were developed as wet strength resins in the 1950s and 1960s, as described in U.S. Pat. No. 2,926,154, incorporated herein by reference. PAE resins are produced by condensing a polyamine (e.g., diethylenetriamine) with a dibasic acid (e.g., adipic acid) or its ester to form a polyaminoamide. Epichlorohydrin is reacted with the primary and secondary amino groups of the polyaminoamide to form epoxides and chlorohydrins. At neutral pH and above ambient temperatures, the chlorohydrin groups cyclize spontaneously to form 3-hydroxyazetidinium groups. These strained rings confer both reactivity and pH independent cationic charge to the resin macromolecule. Some of the azetidinium groups crosslink the macromolecules concurrently with the alkylation and cyclization reactions during resin manufacture, as described in Espy, Tappi J. 78(4):90-99. Examples of PAE resins are shown below.

PAE with epoxide

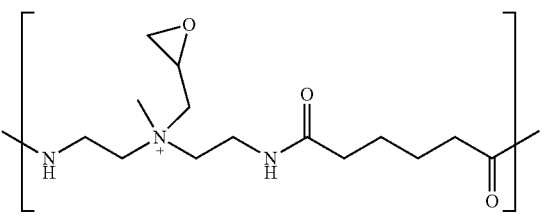

PAE with chlorohydrin

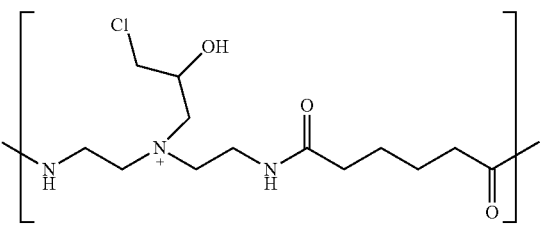

PAE with 3-hydroxyazetidinium

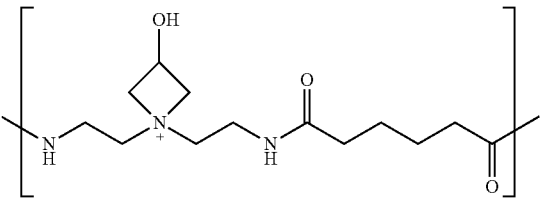

An example of the crosslinking mechanism of a PAE resin is shown below.

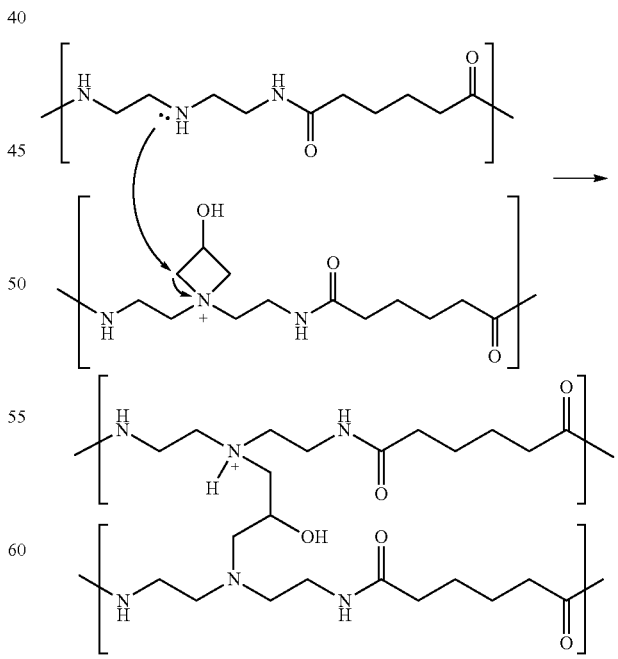

The materials used to produce PAE resins (e.g., diethylenetriamine, adipic acid, epichlorohydrin) are derived from non-renewable resources, such as petroleum, natural gas, and coal. As used herein, "renewable resource" refers to one that is produced by a natural process at a rate comparable to its rate of consumption (e.g., within a 100 year time frame). The resource can be replenished naturally, or via agricultural techniques. Nonlimiting examples of renewable resources include plants (e.g., sugar cane, beets, corn, potatoes, citrus fruit, woody plants, lignocellulosics, hemicellulosics, cellulosic waste), animals, fish, bacteria, fungi, and forestry products. These resources can be naturally occurring, hybrids, or genetically engineered organisms. Natural resources such as crude oil, natural gas, coal, and peat, which take longer than 100 years to form, are examples of non-renewable resources. As used herein, "petroleum" refers to crude oil and its components of paraffinic, cycloparaffinic, and aromatic hydrocarbons. Crude oil may be obtained from tar sands, bitumen fields, and oil shale.

Thus, the price and availability of the petroleum, natural gas, and coal feedstock ultimately have a significant impact on the price of PAE resins. As the worldwide price of petroleum, natural gas, and/or coal escalates, so does the price of PAE resins and articles made using PAE resins, such as paper towels. Furthermore, many consumers display an aversion to purchasing products that are derived from petrochemicals. In some instances, consumers are hesitant to purchase products made from limited non-renewable resources (e.g., petroleum, natural gas, and coal). Other consumers may have adverse perceptions about products derived from petrochemicals as being "unnatural" or not environmentally friendly.

Accordingly, it would be desirable to provide cationic polymers suitable for use as wet strength resins using monomers derived from renewable resources, where the resulting polymer has desired performance characteristics, such as appropriate wet strength, dry strength, and wet strength to dry strength ratio with no negative impact on properties, such as paper softness.

SUMMARY OF THE INVENTION

In one aspect, the invention relates to a polymer of Formula I:

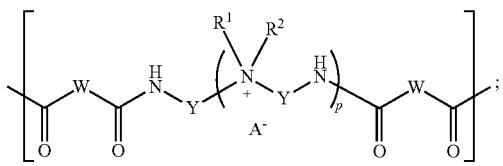
(I)

wherein A is Cl, Br, OH, $NO_3$, or $BF_4$;
each W independently is $(CH_2)_{1-8}$ or

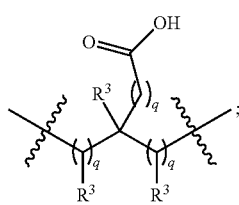

each Y independently is $(CH_2)_{1-8}$ or

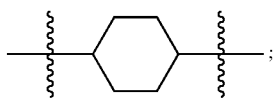

each $R^1$ independently is H,

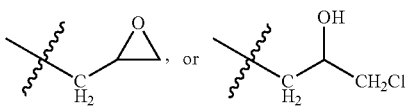

and each $R^2$ is H; or $R^1$ and $R^2$ together with the nitrogen to which they are attached form

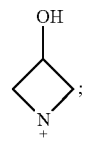

with the proviso that about 20 mole percent to about 40 mole percent of $R^1$ are H;
each $R^3$ independently is H or OH;
p is 1-8;
each q independently is 0-8;
wherein the molar ratio of W to Y is about 0.8:1 to about 1.4:1; and,
wherein at least one of W or Y and/or Formula I has a biobased content of at least about 95%, preferably at least about 97%, more preferably at least about 99%.

In another aspect, the invention relates to a method of synthesizing the polymer of Formula I, wherein the method comprises:
(a) reacting:
(i)

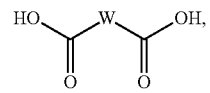

which may have a biobased content of at least about 95%; and,
(ii)

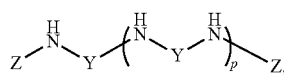

which may have a biobased content of at least about 95%;
to form

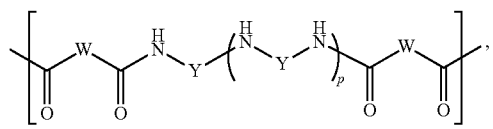

which may have a biobased content of at least about 95%; and, (b) functionalizing the product from step (a) with

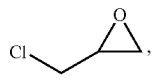

which may have a biobased content of at least about 95%; wherein each W independently is $(CH_2)_{1-8}$ or

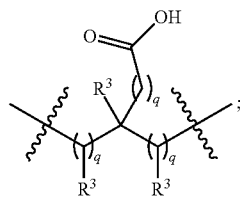

which may have a biobased content of at least about 95%; each Y independently is $(CH_2)_{1-8}$ or

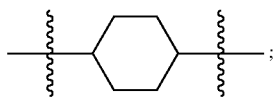

which may have a biobased content of at least about 95%; each Z independently is H or

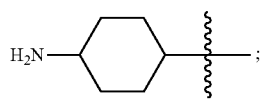

which may have a biobased content of at least 95%;
each $R^3$ independently is H or OH;
p is 1-8;
each q independently is 0-8; and,
the molar ratio of W to Y is about 0.8:1 to about 1.4:1.

In yet another aspect, the invention relates to a paper article comprising a polymer of Formula I, wherein the paper article has a dry strength of about 300 g/in per ply to about 2000 g/in per ply, and a wet strength of about 60 g/in per ply to about 400 g/in per ply. In some embodiments, the paper article is selected from the group consisting of a towel, a tissue (e.g., a facial tissue), and paperboard having single or multiple ply characteristics.

DETAILED DESCRIPTION OF THE PREFERRED EMBODIMENTS

A sustainable, wet strength resin has now been found that is entirely derived from renewable resources. As used herein, "sustainable" refers to a material having an improvement of greater than 10% in some aspect of its Life Cycle Assessment, when compared to similar virgin, petroleum-based material. As used herein, "Life Cycle Assessment" (LCA) or "Life Cycle Inventory" (LCI) refers to the investigation and evaluation of the environmental impacts of a given product or service caused or necessitated by its existence. The LCA or LCI can involve a "cradle-to-grave" analysis, which refers to the full Life Cycle Assessment or Life Cycle Inventory from manufacture ("cradle") to use phase and disposal phase ("grave"). All inputs and outputs are considered for all the phases of the life cycle. As used herein, "End of Life" (EoL) scenario refers to the disposal phase of the LCA. Alternatively, LCA can involve a "cradle-to-gate" analysis, which refers to an assessment of a partial product life cycle from manufacture ("cradle") to the factory gate (i.e., before it is transported to the consumer) as a pellet.

The renewable wet strength resins of the invention are advantageous because they have the same performance characteristics as wet strength resins made from petroleum-based resources, yet improved sustainability, which reduces dependence on petroleum supplies.

All percentages herein are by weight unless specified otherwise.

Cationic Polymers Comprising Monomers Derived From Renewable Resources

In one aspect, the invention relates to a sustainable, cationic polymer of Formula I:

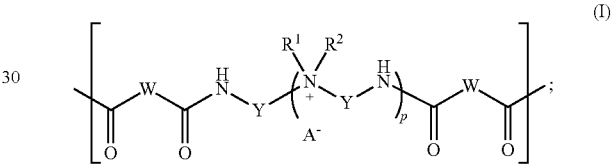

wherein A is Cl, Br, OH, $NO_3$, or $BF_4$;
each W independently is $(CH_2)_{1-8}$ or

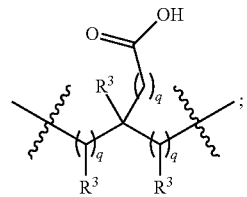

each Y independently is $(CH_2)_{1-8}$ or

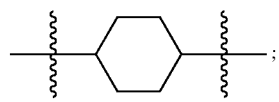

each $R^1$ independently is H,

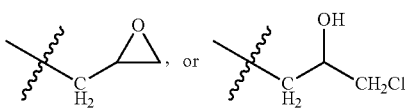

and each $R^2$ is H; or $R^1$ and $R^2$ together with the nitrogen to which they are attached form

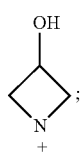

with the proviso that about 20 mole percent to about 40 mole percent, preferably about 25 mole percent to about 35 mole percent, for example, about 30 mole percent, of $R^1$ are H;
each $R^3$ independently is H or OH;
p is 1-8; and,
each q independently is 0-8.

In some embodiments, the molar ratio of W to Y is about 0.8:1 to about 1.4:1, preferably about 0.9:1 to about 1.2:1, for example, about 0.92:1 to about 1.14:1

At least one of W and Y and/or the polymer of Formula I may have a biobased content of at least about 95%, preferably at least about 97%, more preferably at least about 99%, for example, 100%. As used herein, "biobased content" refers to the amount of biobased carbon in a material as a percent of the weight (mass) of the total organic carbon in the product. For example, polyethylene contains two carbon atoms in its structural unit. If ethylene is derived from a renewable resource, then a homopolymer of polyethylene theoretically has a biobased content of 100% because all of the carbon atoms are derived from a renewable resource. A copolymer of polyethylene could also theoretically have a biobased content of 100% if both the ethylene and the co-monomer are each derived from a renewable resource. As another example, polyethylene terephthalate contains ten carbon atoms in its structural unit (i.e., two carbon atoms from the ethylene glycol monomer and eight carbon atoms from the terephthalic acid monomer). If the ethylene glycol portion is derived from a renewable resource, but the terephthalic acid is derived from a petroleum-based resource, the theoretical biobased content of the polyethylene terephthalate is 20%.

In some embodiments, each W independently is $(CH_2)_{1-8}$, preferably $(CH_2)_{2-4}$, for example, $(CH_2)_4$.

In some embodiments, each Y independently is $(CH_2)_{1-8}$, preferably $(CH_2)_{2-4}$, for example, $(CH_2)_2$.

In some embodiments, p is 1-4, preferably 1-3, for example, 1.

In some preferred embodiments, each A is Cl, each W independently is $(CH_2)_4$, each Y independently is $(CH_2)_2$, each $R^1$ and $R^2$ are as described above, and p is 1. In some embodiments, the wet strength polymer is polyetherimide that has been functionalized with epichlorohydrin.

Nonlimiting examples of the wet strength polymer are shown in the below Table 1, wherein each $R^1$ and $R^2$ are as previously described.

TABLE 1

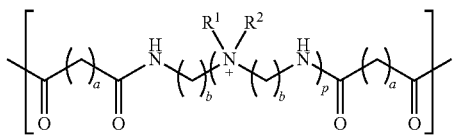

| a | b | p |
|---|---|---|
| 1 | 1 | 1 |
| 2 | 1 | 1 |
| 3 | 1 | 1 |
| 4 | 1 | 1 |

TABLE 1-continued

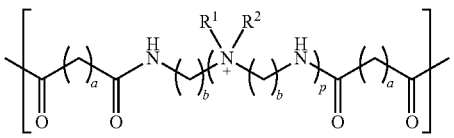

| a | b | p |
|---|---|---|
| 5 | 1 | 1 |
| 6 | 1 | 1 |
| 7 | 1 | 1 |
| 8 | 1 | 1 |
| 1 | 2 | 1 |
| 2 | 2 | 1 |
| 3 | 2 | 1 |
| 4 | 2 | 1 |
| 5 | 2 | 1 |
| 6 | 2 | 1 |
| 7 | 2 | 1 |
| 8 | 2 | 1 |
| 1 | 3 | 1 |
| 2 | 3 | 1 |
| 3 | 3 | 1 |
| 4 | 3 | 1 |
| 5 | 3 | 1 |
| 6 | 3 | 1 |
| 7 | 3 | 1 |
| 8 | 3 | 1 |
| 1 | 4 | 1 |
| 2 | 4 | 1 |
| 3 | 4 | 1 |
| 4 | 4 | 1 |
| 5 | 4 | 1 |
| 6 | 4 | 1 |
| 7 | 4 | 1 |
| 8 | 4 | 1 |
| 1 | 5 | 1 |
| 2 | 5 | 1 |
| 3 | 5 | 1 |
| 4 | 5 | 1 |
| 5 | 5 | 1 |
| 6 | 5 | 1 |
| 7 | 5 | 1 |
| 8 | 5 | 1 |
| 1 | 6 | 1 |
| 2 | 6 | 1 |
| 3 | 6 | 1 |
| 4 | 6 | 1 |
| 5 | 6 | 1 |
| 6 | 6 | 1 |
| 7 | 6 | 1 |
| 8 | 6 | 1 |
| 1 | 7 | 1 |
| 2 | 7 | 1 |
| 3 | 7 | 1 |
| 4 | 7 | 1 |
| 5 | 7 | 1 |
| 6 | 7 | 1 |
| 7 | 7 | 1 |
| 8 | 7 | 1 |
| 1 | 8 | 1 |
| 2 | 8 | 1 |
| 3 | 8 | 1 |
| 4 | 8 | 1 |
| 5 | 8 | 1 |
| 6 | 8 | 1 |
| 7 | 8 | 1 |
| 8 | 8 | 1 |
| 1 | 1 | 2 |
| 2 | 1 | 2 |
| 3 | 1 | 2 |
| 4 | 1 | 2 |
| 5 | 1 | 2 |
| 6 | 1 | 2 |
| 7 | 1 | 2 |
| 8 | 1 | 2 |
| 1 | 2 | 2 |
| 2 | 2 | 2 |
| 3 | 2 | 2 |

TABLE 1-continued
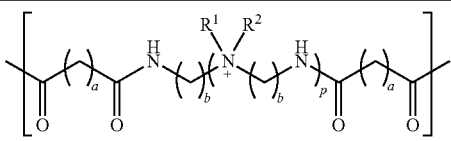
| a | b | p |
|---|---|---|
| 4 | 2 | 2 |
| 5 | 2 | 2 |
| 6 | 2 | 2 |
| 7 | 2 | 2 |
| 8 | 2 | 2 |
| 1 | 3 | 2 |
| 2 | 3 | 2 |
| 3 | 3 | 2 |
| 4 | 3 | 2 |
| 5 | 3 | 2 |
| 6 | 3 | 2 |
| 7 | 3 | 2 |
| 8 | 3 | 2 |
| 1 | 4 | 2 |
| 2 | 4 | 2 |
| 3 | 4 | 2 |
| 4 | 4 | 2 |
| 5 | 4 | 2 |
| 6 | 4 | 2 |
| 7 | 4 | 2 |
| 8 | 4 | 2 |
| 1 | 5 | 2 |
| 2 | 5 | 2 |
| 3 | 5 | 2 |
| 4 | 5 | 2 |
| 5 | 5 | 2 |
| 6 | 5 | 2 |
| 7 | 5 | 2 |
| 8 | 5 | 2 |
| 1 | 6 | 2 |
| 2 | 6 | 2 |
| 3 | 6 | 2 |
| 4 | 6 | 2 |
| 5 | 6 | 2 |
| 6 | 6 | 2 |
| 7 | 6 | 2 |
| 8 | 6 | 2 |
| 1 | 7 | 2 |
| 2 | 7 | 2 |
| 3 | 7 | 2 |
| 4 | 7 | 2 |
| 5 | 7 | 2 |
| 6 | 7 | 2 |
| 7 | 7 | 2 |
| 8 | 7 | 2 |
| 1 | 8 | 2 |
| 2 | 8 | 2 |
| 3 | 8 | 2 |
| 4 | 8 | 2 |
| 5 | 8 | 2 |
| 6 | 8 | 2 |
| 7 | 8 | 2 |
| 8 | 8 | 2 |
| 1 | 1 | 3 |
| 2 | 1 | 3 |
| 3 | 1 | 3 |
| 4 | 1 | 3 |
| 5 | 1 | 3 |
| 6 | 1 | 3 |
| 7 | 1 | 3 |
| 8 | 1 | 3 |
| 1 | 2 | 3 |
| 2 | 2 | 3 |
| 3 | 2 | 3 |
| 4 | 2 | 3 |
| 5 | 2 | 3 |
| 6 | 2 | 3 |
| 7 | 2 | 3 |
| 8 | 2 | 3 |
| 1 | 3 | 3 |
| 2 | 3 | 3 |
TABLE 1-continued
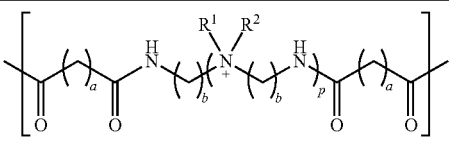
| a | b | p |
|---|---|---|
| 3 | 3 | 3 |
| 4 | 3 | 3 |
| 5 | 3 | 3 |
| 6 | 3 | 3 |
| 7 | 3 | 3 |
| 8 | 3 | 3 |
| 1 | 4 | 3 |
| 2 | 4 | 3 |
| 3 | 4 | 3 |
| 4 | 4 | 3 |
| 5 | 4 | 3 |
| 6 | 4 | 3 |
| 7 | 4 | 3 |
| 8 | 4 | 3 |
| 1 | 5 | 3 |
| 2 | 5 | 3 |
| 3 | 5 | 3 |
| 4 | 5 | 3 |
| 5 | 5 | 3 |
| 6 | 5 | 3 |
| 7 | 5 | 3 |
| 8 | 5 | 3 |
| 1 | 6 | 3 |
| 2 | 6 | 3 |
| 3 | 6 | 3 |
| 4 | 6 | 3 |
| 5 | 6 | 3 |
| 6 | 6 | 3 |
| 7 | 6 | 3 |
| 8 | 6 | 3 |
| 1 | 7 | 3 |
| 2 | 7 | 3 |
| 3 | 7 | 3 |
| 4 | 7 | 3 |
| 5 | 7 | 3 |
| 6 | 7 | 3 |
| 7 | 7 | 3 |
| 8 | 7 | 3 |
| 1 | 8 | 3 |
| 2 | 8 | 3 |
| 3 | 8 | 3 |
| 4 | 8 | 3 |
| 5 | 8 | 3 |
| 6 | 8 | 3 |
| 7 | 8 | 3 |
| 8 | 8 | 3 |
| 1 | 1 | 4 |
| 2 | 1 | 4 |
| 3 | 1 | 4 |
| 4 | 1 | 4 |
| 5 | 1 | 4 |
| 6 | 1 | 4 |
| 7 | 1 | 4 |
| 8 | 1 | 4 |
| 1 | 2 | 4 |
| 2 | 2 | 4 |
| 3 | 2 | 4 |
| 4 | 2 | 4 |
| 5 | 2 | 4 |
| 6 | 2 | 4 |
| 7 | 2 | 4 |
| 8 | 2 | 4 |
| 1 | 3 | 4 |
| 2 | 3 | 4 |
| 3 | 3 | 4 |
| 4 | 3 | 4 |
| 5 | 3 | 4 |
| 6 | 3 | 4 |
| 7 | 3 | 4 |
| 8 | 3 | 4 |
| 1 | 4 | 4 |

TABLE 1-continued
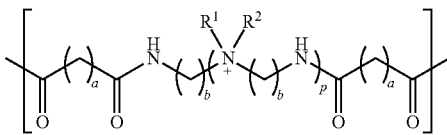
| a | b | p |
|---|---|---|
| 2 | 4 | 4 |
| 3 | 4 | 4 |
| 4 | 4 | 4 |
| 5 | 4 | 4 |
| 6 | 4 | 4 |
| 7 | 4 | 4 |
| 8 | 4 | 4 |
| 1 | 5 | 4 |
| 2 | 5 | 4 |
| 3 | 5 | 4 |
| 4 | 5 | 4 |
| 5 | 5 | 4 |
| 6 | 5 | 4 |
| 7 | 5 | 4 |
| 8 | 5 | 4 |
| 1 | 5 | 4 |
| 2 | 6 | 4 |
| 3 | 6 | 4 |
| 4 | 6 | 4 |
| 5 | 6 | 4 |
| 6 | 6 | 4 |
| 7 | 5 | 4 |
| 8 | 6 | 4 |
| 1 | 7 | 4 |
| 2 | 7 | 4 |
| 3 | 7 | 4 |
| 4 | 7 | 4 |
| 5 | 7 | 4 |
| 6 | 7 | 4 |
| 7 | 7 | 4 |
| 8 | 7 | 4 |
| 1 | 8 | 4 |
| 2 | 8 | 4 |
| 3 | 8 | 4 |
| 4 | 8 | 4 |
| 5 | 8 | 4 |
| 6 | 8 | 4 |
| 7 | 8 | 4 |
| 8 | 8 | 4 |
| 1 | 1 | 5 |
| 2 | 1 | 5 |
| 3 | 1 | 5 |
| 4 | 1 | 5 |
| 5 | 1 | 5 |
| 6 | 1 | 5 |
| 7 | 1 | 5 |
| 8 | 1 | 5 |
| 1 | 2 | 5 |
| 2 | 2 | 5 |
| 3 | 2 | 5 |
| 4 | 2 | 5 |
| 5 | 2 | 5 |
| 6 | 2 | 5 |
| 7 | 2 | 5 |
| 8 | 2 | 5 |
| 1 | 3 | 5 |
| 2 | 3 | 5 |
| 3 | 3 | 5 |
| 4 | 3 | 5 |
| 5 | 3 | 5 |
| 6 | 3 | 5 |
| 7 | 3 | 5 |
| 8 | 3 | 5 |
| 1 | 4 | 5 |
| 2 | 4 | 5 |
| 3 | 4 | 5 |
| 4 | 4 | 5 |
| 5 | 4 | 5 |
| 6 | 4 | 5 |
| 7 | 4 | 5 |
| 8 | 4 | 5 |
TABLE 1-continued
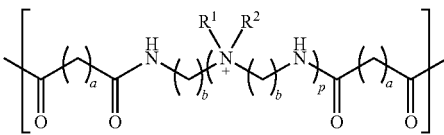
| a | b | p |
|---|---|---|
| 1 | 5 | 5 |
| 2 | 5 | 5 |
| 3 | 5 | 5 |
| 4 | 5 | 5 |
| 5 | 5 | 5 |
| 6 | 5 | 5 |
| 7 | 5 | 5 |
| 8 | 5 | 5 |
| 1 | 6 | 5 |
| 2 | 6 | 5 |
| 3 | 6 | 5 |
| 4 | 6 | 5 |
| 5 | 6 | 5 |
| 6 | 6 | 5 |
| 7 | 6 | 5 |
| 8 | 6 | 5 |
| 1 | 7 | 5 |
| 2 | 7 | 5 |
| 3 | 7 | 5 |
| 4 | 7 | 5 |
| 5 | 7 | 5 |
| 6 | 7 | 5 |
| 7 | 7 | 5 |
| 8 | 7 | 5 |
| 1 | 8 | 5 |
| 2 | 8 | 5 |
| 3 | 8 | 5 |
| 4 | 8 | 5 |
| 5 | 8 | 5 |
| 6 | 8 | 5 |
| 7 | 8 | 5 |
| 8 | 8 | 5 |
| 1 | 1 | 6 |
| 2 | 1 | 6 |
| 3 | 1 | 6 |
| 4 | 1 | 6 |
| 5 | 1 | 6 |
| 6 | 1 | 6 |
| 7 | 1 | 6 |
| 8 | 1 | 6 |
| 1 | 2 | 6 |
| 2 | 2 | 6 |
| 3 | 2 | 6 |
| 4 | 2 | 6 |
| 5 | 2 | 6 |
| 6 | 2 | 6 |
| 7 | 2 | 6 |
| 8 | 2 | 6 |
| 1 | 3 | 6 |
| 2 | 3 | 6 |
| 3 | 3 | 6 |
| 4 | 3 | 6 |
| 5 | 3 | 6 |
| 6 | 3 | 6 |
| 7 | 3 | 6 |
| 8 | 3 | 6 |
| 1 | 4 | 6 |
| 2 | 4 | 6 |
| 3 | 4 | 6 |
| 4 | 4 | 6 |
| 5 | 4 | 6 |
| 6 | 4 | 6 |
| 7 | 4 | 6 |
| 8 | 4 | 6 |
| 1 | 5 | 6 |
| 2 | 5 | 6 |
| 3 | 5 | 6 |
| 4 | 5 | 6 |
| 5 | 5 | 6 |
| 6 | 5 | 6 |
| 7 | 5 | 6 |

TABLE 1-continued
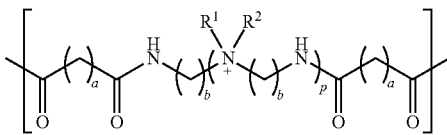
| a | b | p |
|---|---|---|
| 8 | 5 | 6 |
| 1 | 6 | 6 |
| 2 | 6 | 6 |
| 3 | 6 | 6 |
| 4 | 6 | 6 |
| 5 | 6 | 6 |
| 6 | 6 | 6 |
| 7 | 6 | 6 |
| 8 | 6 | 6 |
| 1 | 7 | 6 |
| 2 | 7 | 6 |
| 3 | 7 | 6 |
| 4 | 7 | 6 |
| 5 | 7 | 6 |
| 6 | 7 | 6 |
| 7 | 7 | 6 |
| 8 | 7 | 6 |
| 1 | 8 | 6 |
| 2 | 8 | 6 |
| 3 | 8 | 6 |
| 4 | 8 | 6 |
| 5 | 8 | 6 |
| 6 | 8 | 6 |
| 7 | 8 | 6 |
| 8 | 8 | 6 |
| 1 | 1 | 7 |
| 2 | 1 | 7 |
| 3 | 1 | 7 |
| 4 | 1 | 7 |
| 5 | 1 | 7 |
| 6 | 1 | 7 |
| 7 | 1 | 7 |
| 8 | 1 | 7 |
| 1 | 2 | 7 |
| 2 | 2 | 7 |
| 3 | 2 | 7 |
| 4 | 2 | 7 |
| 5 | 2 | 7 |
| 6 | 2 | 7 |
| 7 | 2 | 7 |
| 8 | 2 | 7 |
| 1 | 3 | 7 |
| 2 | 3 | 7 |
| 3 | 3 | 7 |
| 4 | 3 | 7 |
| 5 | 3 | 7 |
| 6 | 3 | 7 |
| 7 | 3 | 7 |
| 8 | 3 | 7 |
| 1 | 4 | 7 |
| 2 | 4 | 7 |
| 3 | 4 | 7 |
| 4 | 4 | 7 |
| 5 | 4 | 7 |
| 6 | 4 | 7 |
| 7 | 4 | 7 |
| 8 | 4 | 7 |
| 1 | 5 | 7 |
| 2 | 5 | 7 |
| 3 | 5 | 7 |
| 4 | 5 | 7 |
| 5 | 5 | 7 |
| 6 | 5 | 7 |
| 7 | 5 | 7 |
| 8 | 5 | 7 |
| 1 | 6 | 7 |
| 2 | 6 | 7 |
| 3 | 6 | 7 |
| 4 | 6 | 7 |
| 5 | 6 | 7 |
| 6 | 6 | 7 |
TABLE 1-continued
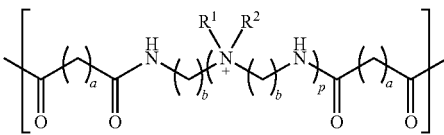
| a | b | p |
|---|---|---|
| 7 | 6 | 7 |
| 8 | 6 | 7 |
| 1 | 7 | 7 |
| 2 | 7 | 7 |
| 3 | 7 | 7 |
| 4 | 7 | 7 |
| 5 | 7 | 7 |
| 6 | 7 | 7 |
| 7 | 7 | 7 |
| 8 | 7 | 7 |
| 1 | 8 | 7 |
| 2 | 8 | 7 |
| 3 | 8 | 7 |
| 4 | 8 | 7 |
| 5 | 8 | 7 |
| 6 | 8 | 7 |
| 7 | 8 | 7 |
| 8 | 8 | 7 |
| 1 | 1 | 8 |
| 2 | 1 | 8 |
| 3 | 1 | 8 |
| 4 | 1 | 8 |
| 5 | 1 | 8 |
| 6 | 1 | 8 |
| 7 | 1 | 8 |
| 8 | 1 | 8 |
| 1 | 2 | 8 |
| 2 | 2 | 8 |
| 3 | 2 | 8 |
| 4 | 2 | 8 |
| 5 | 2 | 8 |
| 6 | 2 | 8 |
| 7 | 2 | 8 |
| 8 | 2 | 8 |
| 1 | 3 | 8 |
| 2 | 3 | 8 |
| 3 | 3 | 8 |
| 4 | 3 | 8 |
| 5 | 3 | 8 |
| 6 | 3 | 8 |
| 7 | 3 | 8 |
| 8 | 3 | 8 |
| 1 | 4 | 8 |
| 2 | 4 | 8 |
| 3 | 4 | 8 |
| 4 | 4 | 8 |
| 5 | 4 | 8 |
| 6 | 4 | 8 |
| 7 | 4 | 8 |
| 8 | 4 | 8 |
| 1 | 5 | 8 |
| 2 | 5 | 8 |
| 3 | 5 | 8 |
| 4 | 5 | 8 |
| 5 | 5 | 8 |
| 6 | 5 | 8 |
| 7 | 5 | 8 |
| 8 | 5 | 8 |
| 1 | 6 | 8 |
| 2 | 6 | 8 |
| 3 | 6 | 8 |
| 4 | 6 | 8 |
| 5 | 6 | 8 |
| 6 | 6 | 8 |
| 7 | 6 | 8 |
| 8 | 6 | 8 |
| 1 | 7 | 8 |
| 2 | 7 | 8 |
| 3 | 7 | 8 |
| 4 | 7 | 8 |
| 5 | 7 | 8 |

TABLE 1-continued

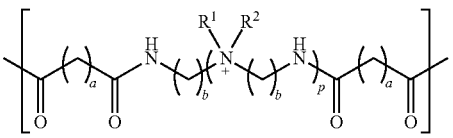

| a | b | p |
|---|---|---|
| 6 | 7 | 8 |
| 7 | 7 | 8 |
| 8 | 7 | 8 |
| 1 | 8 | 8 |
| 2 | 8 | 8 |
| 3 | 8 | 8 |
| 4 | 8 | 8 |
| 5 | 8 | 8 |

TABLE 1-continued

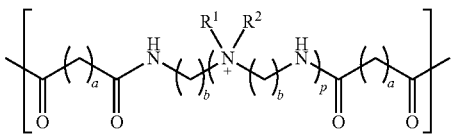

| a | b | p |
|---|---|---|
| 6 | 8 | 8 |
| 7 | 8 | 8 |
| 8 | 8 | 8 |

Additional nonlimiting examples of the wet strength polymer are shown in the below Table 2, wherein each $R^1$ and $R^2$ are as previously described.

TABLE 2

| b | p | q | q' | q" | $R^3$ | $R^{3'}$ | $R^{3''}$ |
|---|---|---|----|----|-------|----------|-----------|
| 1 | 1 | 1 | 1 | 0 | H | H | H |
| 2 | 1 | 1 | 1 | 0 | H | H | H |
| 3 | 1 | 1 | 1 | 0 | H | H | H |
| 4 | 1 | 1 | 1 | 0 | H | H | H |
| 5 | 1 | 1 | 1 | 0 | H | H | H |
| 6 | 1 | 1 | 1 | 0 | H | H | H |
| 7 | 1 | 1 | 1 | 0 | H | H | H |
| 8 | 1 | 1 | 1 | 0 | H | H | H |
| 1 | 1 | 1 | 1 | 0 | H | H | OH |
| 2 | 1 | 1 | 1 | 0 | H | H | OH |
| 3 | 1 | 1 | 1 | 0 | H | H | OH |
| 4 | 1 | 1 | 1 | 0 | H | H | OH |
| 5 | 1 | 1 | 1 | 0 | H | H | OH |
| 6 | 1 | 1 | 1 | 0 | H | H | OH |
| 7 | 1 | 1 | 1 | 0 | H | H | OH |
| 8 | 1 | 1 | 1 | 0 | H | H | OH |
| 1 | 1 | 1 | 1 | 0 | OH | H | H |
| 2 | 1 | 1 | 1 | 0 | OH | H | H |
| 3 | 1 | 1 | 1 | 0 | OH | H | H |
| 4 | 1 | 1 | 1 | 0 | OH | H | H |
| 5 | 1 | 1 | 1 | 0 | OH | H | H |
| 6 | 1 | 1 | 1 | 0 | OH | H | H |
| 7 | 1 | 1 | 1 | 0 | OH | H | H |
| 8 | 1 | 1 | 1 | 0 | OH | H | H |
| 1 | 2 | 1 | 1 | 0 | H | H | H |
| 2 | 2 | 1 | 1 | 0 | H | H | H |
| 3 | 2 | 1 | 1 | 0 | H | H | H |
| 4 | 2 | 1 | 1 | 0 | H | H | H |
| 5 | 2 | 1 | 1 | 0 | H | H | H |
| 6 | 2 | 1 | 1 | 0 | H | H | H |
| 7 | 2 | 1 | 1 | 0 | H | H | H |
| 8 | 2 | 1 | 1 | 0 | H | H | H |
| 1 | 2 | 1 | 1 | 0 | H | H | OH |
| 2 | 2 | 1 | 1 | 0 | H | H | OH |
| 3 | 2 | 1 | 1 | 0 | H | H | OH |
| 4 | 2 | 1 | 1 | 0 | H | H | OH |
| 5 | 2 | 1 | 1 | 0 | H | H | OH |
| 6 | 2 | 1 | 1 | 0 | H | H | OH |
| 7 | 2 | 1 | 1 | 0 | H | H | OH |
| 8 | 2 | 1 | 1 | 0 | H | H | OH |
| 1 | 2 | 1 | 1 | 0 | OH | H | H |
| 2 | 2 | 1 | 1 | 0 | OH | H | H |
| 3 | 2 | 1 | 1 | 0 | OH | H | H |
| 4 | 2 | 1 | 1 | 0 | OH | H | H |
| 5 | 2 | 1 | 1 | 0 | OH | H | H |
| 6 | 2 | 1 | 1 | 0 | OH | H | H |

TABLE 2-continued
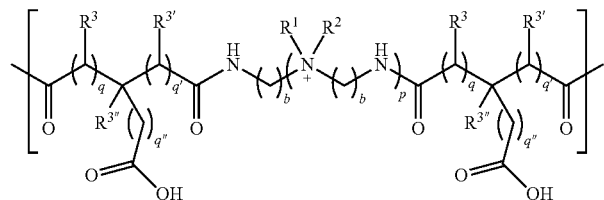
| b | p | q | q' | q" | R³ | R³' | R³" |
|---|---|---|----|----|-----|-----|-----|
| 7 | 2 | 1 | 1 | 0 | OH | H | H |
| 8 | 2 | 1 | 1 | 0 | OH | H | H |
| 1 | 3 | 1 | 1 | 0 | H | H | H |
| 2 | 3 | 1 | 1 | 0 | H | H | H |
| 3 | 3 | 1 | 1 | 0 | H | H | H |
| 4 | 3 | 1 | 1 | 0 | H | H | H |
| 5 | 3 | 1 | 1 | 0 | H | H | H |
| 6 | 3 | 1 | 1 | 0 | H | H | H |
| 7 | 3 | 1 | 1 | 0 | H | H | H |
| 8 | 3 | 1 | 1 | 0 | H | H | H |
| 1 | 3 | 1 | 1 | 0 | H | H | OH |
| 2 | 3 | 1 | 1 | 0 | H | H | OH |
| 3 | 3 | 1 | 1 | 0 | H | H | OH |
| 4 | 3 | 1 | 1 | 0 | H | H | OH |
| 5 | 3 | 1 | 1 | 0 | H | H | OH |
| 6 | 3 | 1 | 1 | 0 | H | H | OH |
| 7 | 3 | 1 | 1 | 0 | H | H | OH |
| 8 | 3 | 1 | 1 | 0 | H | H | OH |
| 1 | 3 | 1 | 1 | 0 | OH | H | H |
| 2 | 3 | 1 | 1 | 0 | OH | H | H |
| 3 | 3 | 1 | 1 | 0 | OH | H | H |
| 4 | 3 | 1 | 1 | 0 | OH | H | H |
| 5 | 3 | 1 | 1 | 0 | OH | H | H |
| 6 | 3 | 1 | 1 | 0 | OH | H | H |
| 7 | 3 | 1 | 1 | 0 | OH | H | H |
| 8 | 3 | 1 | 1 | 0 | OH | H | H |
| 1 | 4 | 1 | 1 | 0 | H | H | H |
| 2 | 4 | 1 | 1 | 0 | H | H | H |
| 3 | 4 | 1 | 1 | 0 | H | H | H |
| 5 | 4 | 1 | 1 | 0 | H | H | H |
| 6 | 4 | 1 | 1 | 0 | H | H | H |
| 7 | 4 | 1 | 1 | 0 | H | H | H |
| 8 | 4 | 1 | 1 | 0 | H | H | H |
| 1 | 4 | 1 | 1 | 0 | H | H | OH |
| 2 | 4 | 1 | 1 | 0 | H | H | OH |
| 3 | 4 | 1 | 1 | 0 | H | H | OH |
| 4 | 4 | 1 | 1 | 0 | H | H | OH |
| 5 | 4 | 1 | 1 | 0 | H | H | OH |
| 6 | 4 | 1 | 1 | 0 | H | H | OH |
| 7 | 4 | 1 | 1 | 0 | H | H | OH |
| 8 | 4 | 1 | 1 | 0 | H | H | OH |
| 1 | 4 | 1 | 1 | 0 | OH | H | H |
| 2 | 4 | 1 | 1 | 0 | OH | H | H |
| 3 | 4 | 1 | 1 | 0 | OH | H | H |
| 4 | 4 | 1 | 1 | 0 | OH | H | H |
| 5 | 4 | 1 | 1 | 0 | OH | H | H |
| 6 | 4 | 1 | 1 | 0 | OH | H | H |
| 7 | 4 | 1 | 1 | 0 | OH | H | H |
| 8 | 4 | 1 | 1 | 0 | OH | H | H |
| 1 | 5 | 1 | 1 | 0 | H | H | H |
| 2 | 5 | 1 | 1 | 0 | H | H | H |
| 3 | 5 | 1 | 1 | 0 | H | H | H |
| 4 | 5 | 1 | 1 | 0 | H | H | H |
| 5 | 5 | 1 | 1 | 0 | H | H | H |
| 6 | 5 | 1 | 1 | 0 | H | H | H |
| 7 | 5 | 1 | 1 | 0 | H | H | H |
| 8 | 5 | 1 | 1 | 0 | H | H | H |
| 1 | 5 | 1 | 1 | 0 | H | H | OH |
| 2 | 5 | 1 | 1 | 0 | H | H | OH |
| 3 | 5 | 1 | 1 | 0 | H | H | OH |
| 4 | 5 | 1 | 1 | 0 | H | H | OH |
| 5 | 5 | 1 | 1 | 0 | H | H | OH |
| 6 | 5 | 1 | 1 | 0 | H | H | OH |
| 7 | 5 | 1 | 1 | 0 | H | H | OH |
| 8 | 5 | 1 | 1 | 0 | H | H | OH |
| 1 | 5 | 1 | 1 | 0 | OH | H | H |
| 2 | 5 | 1 | 1 | 0 | OH | H | H |

TABLE 2-continued
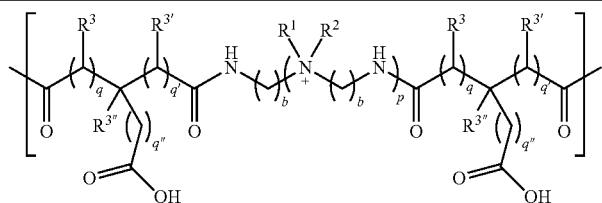
| b | p | q | q' | q" | R³ | R³' | R³" |
|---|---|---|----|----|-----|-----|-----|
| 3 | 5 | 1 | 1 | 0 | OH | H | H |
| 4 | 5 | 1 | 1 | 0 | OH | H | H |
| 5 | 5 | 1 | 1 | 0 | OH | H | H |
| 6 | 5 | 1 | 1 | 0 | OH | H | H |
| 7 | 5 | 1 | 1 | 0 | OH | H | H |
| 8 | 5 | 1 | 1 | 0 | OH | H | H |
| 1 | 6 | 1 | 1 | 0 | H | H | H |
| 2 | 6 | 1 | 1 | 0 | H | H | H |
| 3 | 6 | 1 | 1 | 0 | H | H | H |
| 4 | 6 | 1 | 1 | 0 | H | H | H |
| 5 | 6 | 1 | 1 | 0 | H | H | H |
| 6 | 6 | 1 | 1 | 0 | H | H | H |
| 7 | 6 | 1 | 1 | 0 | H | H | H |
| 8 | 6 | 1 | 1 | 0 | H | H | H |
| 1 | 6 | 1 | 1 | 0 | H | H | OH |
| 2 | 6 | 1 | 1 | 0 | H | H | OH |
| 3 | 6 | 1 | 1 | 0 | H | H | OH |
| 4 | 6 | 1 | 1 | 0 | H | H | OH |
| 5 | 6 | 1 | 1 | 0 | H | H | OH |
| 6 | 6 | 1 | 1 | 0 | H | H | OH |
| 7 | 6 | 1 | 1 | 0 | H | H | OH |
| 8 | 6 | 1 | 1 | 0 | H | H | OH |
| 1 | 6 | 1 | 1 | 0 | OH | H | H |
| 2 | 6 | 1 | 1 | 0 | OH | H | H |
| 3 | 6 | 1 | 1 | 0 | OH | H | H |
| 4 | 6 | 1 | 1 | 0 | OH | H | H |
| 5 | 6 | 1 | 1 | 0 | OH | H | H |
| 6 | 6 | 1 | 1 | 0 | OH | H | H |
| 7 | 6 | 1 | 1 | 0 | OH | H | H |
| 8 | 6 | 1 | 1 | 0 | OH | H | H |
| 1 | 7 | 1 | 1 | 0 | H | H | H |
| 2 | 7 | 1 | 1 | 0 | H | H | H |
| 3 | 7 | 1 | 1 | 0 | H | H | H |
| 4 | 7 | 1 | 1 | 0 | H | H | H |
| 5 | 7 | 1 | 1 | 0 | H | H | H |
| 6 | 7 | 1 | 1 | 0 | H | H | H |
| 7 | 7 | 1 | 1 | 0 | H | H | H |
| 8 | 7 | 1 | 1 | 0 | H | H | H |
| 1 | 7 | 1 | 1 | 0 | H | H | OH |
| 2 | 7 | 1 | 1 | 0 | H | H | OH |
| 3 | 7 | 1 | 1 | 0 | H | H | OH |
| 4 | 7 | 1 | 1 | 0 | H | H | OH |
| 5 | 7 | 1 | 1 | 0 | H | H | OH |
| 6 | 7 | 1 | 1 | 0 | H | H | OH |
| 7 | 7 | 1 | 1 | 0 | H | H | OH |
| 8 | 7 | 1 | 1 | 0 | H | H | OH |
| 1 | 7 | 1 | 1 | 0 | OH | H | H |
| 2 | 7 | 1 | 1 | 0 | OH | H | H |
| 3 | 7 | 1 | 1 | 0 | OH | H | H |
| 4 | 7 | 1 | 1 | 0 | OH | H | H |
| 5 | 7 | 1 | 1 | 0 | OH | H | H |
| 6 | 7 | 1 | 1 | 0 | OH | H | H |
| 7 | 7 | 1 | 1 | 0 | OH | H | H |
| 8 | 7 | 1 | 1 | 0 | OH | H | H |
| 1 | 8 | 1 | 1 | 0 | H | H | H |
| 2 | 8 | 1 | 1 | 0 | H | H | H |
| 3 | 8 | 1 | 1 | 0 | H | H | H |
| 4 | 8 | 1 | 1 | 0 | H | H | H |
| 5 | 8 | 1 | 1 | 0 | H | H | H |
| 6 | 8 | 1 | 1 | 0 | H | H | H |
| 7 | 8 | 1 | 1 | 0 | H | H | H |
| 8 | 8 | 1 | 1 | 0 | H | H | H |
| 1 | 8 | 1 | 1 | 0 | H | H | OH |
| 2 | 8 | 1 | 1 | 0 | H | H | OH |
| 3 | 8 | 1 | 1 | 0 | H | H | OH |
| 4 | 8 | 1 | 1 | 0 | H | H | OH |
| 5 | 8 | 1 | 1 | 0 | H | H | OH |

TABLE 2-continued

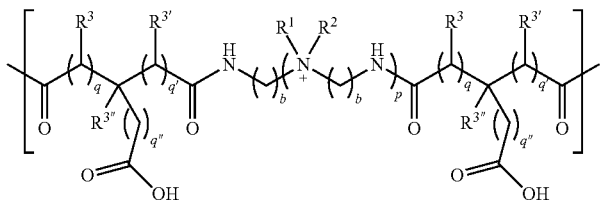

| b | p | q | q' | q" | R³ | R³' | R³" |
|---|---|---|----|----|----|-----|-----|
| 6 | 8 | 1 | 1  | 0  | H  | H   | OH  |
| 7 | 8 | 1 | 1  | 0  | H  | H   | OH  |
| 8 | 8 | 1 | 1  | 0  | H  | H   | OH  |
| 1 | 8 | 1 | 1  | 0  | OH | H   | H   |
| 2 | 8 | 1 | 1  | 0  | OH | H   | H   |
| 3 | 8 | 1 | 1  | 0  | OH | H   | H   |
| 4 | 8 | 1 | 1  | 0  | OH | H   | H   |
| 5 | 8 | 1 | 1  | 0  | OH | H   | H   |
| 6 | 8 | 1 | 1  | 0  | OH | H   | H   |
| 7 | 8 | 1 | 1  | 0  | OH | H   | H   |
| 8 | 8 | 1 | 1  | 0  | OH | H   | H   |

In another aspect, the invention relates to a method for synthesizing the polymer of Formula I, wherein the method comprises:

(a) reacting:

compound (i):

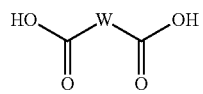

and compound (ii):

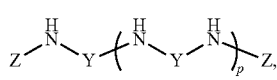

to form compound (iii):

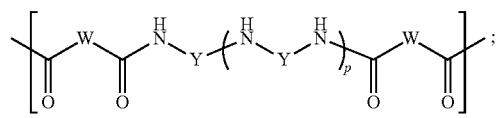

and, (b) functionalizing compound (iii) with

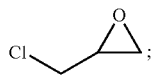

wherein each W independently is $(CH_2)_{1-8}$ or

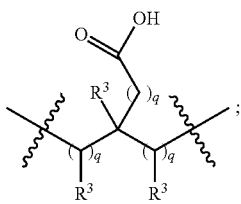

each Y independently is $(CH_2)_{1-8}$ or

each Z independently is H or

each $R^3$ independently is H or OH;
p is 1-8; and,
each q independently is 0-8;
wherein at least one of, in one example all of, (i), (ii), (iii), W, and Y has a biobased content of at least about 95%, preferably about 97%, more preferably about 99%, for example, about 100%.

In some embodiments, the molar ratio of W to Y is about 0.8:1 to about 1.4:1, preferably about 0.9:1 to about 1.2:1, for example, about 0.92:1 to about 1.14:1.

In some embodiments, each W independently is $(CH_2)_{1-8}$, preferably $(CH_2)_{2-4}$, for example, $(CH_2)_4$. In some embodiments, compound (i) is a dicarboxylic acid or tricarboxylic acid selected from the group consisting of malonic acid, succinic acid, glutaric acid, adipic acid, pimelic acid, suberic acid, azelaic acid, sebacic acid, citric acid, isocitric acid, propane-1,2,3-dicarboxylic acid, and mixtures thereof. In some preferred embodiments, compound (i) is selected from the group consisting of malonic acid, succinic acid, glutaric acid, adipic acid, and mixtures thereof. For example, compound (i) is adipic acid.

In some embodiments, each Y independently is $(CH_2)_{1-8}$, preferably $(CH_2)_{2-4}$, for example, $(CH_2)_2$, and p is 1-4, preferably 1-3, for example, 1. In some embodiments, compound (ii) is a polyalkylene polyamine having two primary amines and at least one secondary amine. In some embodiments, compound (ii) is selected from the group consisting of diethylenetriamine, triethylenetetramine, tetraethylenepentamine, dipropylenetriamine, and mixtures thereof. In some preferred embodiments, compound (ii) is diethylenetriamine Derivation of Monomers From Renewable Resources The sustainable cationic polymers of the invention are derived from renewable resources. In some embodiments, the sustainable cationic polymer can be formed by reacting a renewable polyalkylene polyamine with a renewable dicarboxylic or a renewable tricarboxylic acid to form a renewable polyamide, and then functionalizing the renewable polyamide with renewable epichlorohydrin to form a renewable wet strength cationic polymer. In some embodiments, the wet strength polymer is renewable polyetherimide that has been functionalized with renewable epicholorohydrin.

Many of the renewable monomers of the invention are derived from bio-ethylene, bio-propylene, or bio-alcohols derived from renewable resources. As used herein, the prefix "bio-" is used to designate a material that has been derived from a renewable resource.

Bio-Alcohol Production

Monofunctional alcohols, such as methanol; ethanol; isomers of propanol, butanol, pentanol, and hexanol; cyclopentanol; isobornyl alcohol; and higher alcohols; and polyfunctional alcohols, such as ethylene glycol, isomers of propanediol, and glycerol, can be derived from renewable resources via a number of suitable routes (see, e.g., WO 2009/155086 and U.S. Pat. No. 4,536,584, each incorporated herein by reference).

In one route, a renewable resource, such as corn starch, can be enzymatically hydrolyzed to yield glucose and/or other sugars. The resultant sugars can be converted into alcohols by fermentation.

In another route, monofunctional alcohols, such as ethanol and propanol are produced from short chain acids, fatty acids, fats (e.g., animal fat), and oils (e.g., monoglycerides, diglycerides, triglycerides, and mixtures thereof). These short chain acids, fatty acids, fats, and oils can be derived from renewable resources, such as animals or plants. "Short chain acid" refers to a straight chain monocarboyxlic acid having a chain length of 3 to 5 carbon atoms. "Fatty acid" refers to a straight chain monocarboxylic acid having a chain length of 6 to 30 carbon atoms. "Monoglycerides," "diglycerides," and "triglycerides" refer to multiple mono-, di- and tri-esters, respectively, of (i) glycerol and (ii) the same or mixed short chain acids and/or fatty acids.

Nonlimiting examples of short chain acids include propionic acid, butyric acid, and valeric acid. Nonlimiting examples of saturated fatty acids include caproic acid, enanthic acid, caprylic acid, pelargonic acid, capric acid, undecylic acid, lauric acid, tridecylic acid, myristic acid, pentadecylic acid, palmitic acid, margaric acid, stearic acid, nonadecylic acid, arachidic acid, heneicosylic acid, behenic acid, tricosylic acid, lignoceric acid, pentacosylic acid, cerotic acid, heptacosylic acid, montanic acid, nonacoxylic acid, melissic acid, henatriacontylic acid, lacceroic acid, psyllic acid, geddic acid, ceroplastic acid, and hexatriacontylic acid. Nonlimiting examples of unsaturated fatty acids include oleic acid, myristoleic acid, palmitoleic acid, sapienic acid, linoleic acid, linolenic acid, arachidonic acid, eicosapentaenoic acid, and docosahexaenoic acid. Nonlimiting examples of monoglycerides include monoglycerides of any of the fatty acids described herein. Nonlimiting examples of diglycerides include diglycerides of any of the fatty acids described herein. Nonlimiting examples of the triglycerides include triglycerides of any of the fatty acids described herein, such as, for example, tall oil, corn oil, soybean oil, sunflower oil, safflower oil, linseed oil, *perilla* oil, cotton seed oil, tung oil, peanut oil, oiticica oil, hempseed oil, marine oil (e.g. alkali-refined fish oil), dehydrated castor oil, and mixtures thereof. Alcohols can be produced from fatty acids through reduction of the fatty acids by any method known in the art. Alcohols can be produced from fats and oils by first hydrolyzing the fats and oils to produce glycerol and fatty acids, and then subsequently reducing the fatty acids.

In another route, genetically engineered cells and microorganisms are provided that produce products from the fatty acid biosynthetic pathway (i.e., fatty acid derivatives), such as fatty alcohols, as described in International Patent Application Publication No. WO 2008/119082, incorporated herein by reference. For example, a gene encoding a fatty alcohol biosynthetic polypeptide that can be used to produce fatty alcohols, or a fatty aldehyde biosynthetic polypeptide that can be used to produce fatty aldehydes, which subsequently can be converted to fatty alcohols, is expressed in a host cell. The resulting fatty alcohol or fatty aldehyde then is isolated from the host cell. Such methods are described in U.S. Patent Application Publication Nos. 2010/0105963 and 2010/0105955, and International Patent Application Publication Nos. WO 2010/062480 and WO 2010/042664, each incorporated herein by reference.

In another route, fatty acyl chains are produced from renewable biocrude or hydrocarbon feedstocks using recombinant microorganisms, wherein at least one hydrocarbon is produced by the recombinant microorganism. The fatty acyl chains subsequently can be converted to fatty alcohols using methods known in the art. The microorganisms can be engineered to produce specific degrees of branching, saturation, and length, as described in U.S. Patent Application Publication No. 2010/017826, incorporated herein by reference.

Bio-Ethylene Production

Bio-ethylene can be formed from the dehydration of bio-ethanol. Bio-ethanol can be derived from, for example, (i) the fermentation of sugar from sugar cane, sugar beet, or sorghum; (ii) the saccharification of starch from maize, wheat, or manioc; and (iii) the hydrolysis of cellulosic materials. U.S. Patent Application Publication No. 2005/0272134, incorporated herein by reference, describes the fermentation of sugars to form alcohols and acids.

As previously described, suitable sugars used to form ethanol include monosaccharides, disaccharides, trisaccharides, and oligosaccharides. Sugars, such as sucrose, glucose, fructose, and maltose, are readily produced from renewable resources, such as sugar cane and sugar beets. Sugars also can be derived (e.g., via enzymatic cleavage) from other agricultural products (i.e., renewable resources resulting from the cultivation of land or the husbandry of animals). For example, glucose can be prepared on a commercial scale by enzymatic hydrolysis of corn starch. Other common agricultural crops that can be used as the base starch for conversion into glucose include wheat, buckwheat, arracaha, potato, barley, kudzu, cassaya, sorghum, sweet potato, yam, arrowroot, sago, and other like starchy fruit, seeds, or tubers. The sugars produced by these renewable resources (e.g., corn starch from corn) can be used to produce ethanol, as well as other alcohols, such as propanol, and methanol. For example, corn starch can be enzymatically hydrolyzed to yield glucose and/or other sugars. The resultant sugars can be converted into ethanol by fermentation.

In one embodiment, bio-ethylene is produced from sugar cane. The life cycle stages of ethylene production from sugar cane include (i) sugar cane farming, (ii) fermentation of sugar cane to form bio-ethanol, and (iii) dehydration of bio-ethanol to form ethylene. Specifically, sugar cane is washed and transported to mills where sugar cane juice is extracted, leaving filter cake, which is used as fertilizer, and bagasse (residual woody fiber of the cane obtained after crushing). The bagasse is burned to generate steam and the electricity used to power the sugar cane mills, thereby reducing the use of petroleum-derived fuels. The sugar cane juice is fermented using yeast to form a solution of ethanol and water. The ethanol is distilled from the water to yield about 95% pure bio-ethanol. The bio-ethanol is subjected to catalytic dehydration (e.g., with an alumina catalyst) to produce bio-ethylene.

Advantageously, a Life Cycle Assessment and Inventory of ethylene produced from sugar cane shows favorable benefits in some aspects over ethylene produced from petroleum feedstock for global warming potential, abiotic depletion, and fossil fuel consumption. For example, some studies have shown that about one ton of polyethylene made from virgin petroleum-based sources results in the emission of up to about 2.5 tons of carbon dioxide to the environment, as previously described. Thus, use of up to about one ton of polyethylene from a renewable resource, such as sugar cane, results in a decrease of about 5 tons of environmental carbon dioxide versus using one ton of polyethylene derived from petroleum-based resources.

Bio-Propylene

Bio-propylene can be formed from the dehydration of bio-propanol. Renewable resources used to derive bio-propanol are as previously described. Bio-propanol also can be derived from bio-ethylene. In this pathway, bio-ethylene is converted into bio-propionaldehyde by hydroformylation using carbon monoxide and hydrogen in the presence of a catalyst, such as cobalt octacarbonyl or a rhodium complex. Hydrogenation of the bio-propionaldehyde in the presence of a catalyst, such as sodium borohydride and lithium aluminum hydride, yields bio-propan-1-ol, which can be dehydrated in an acid catalyzed reaction to yield bio-propylene, as described in U.S. Patent Application Publication No. 2007/0219521, incorporated herein by reference.

A. Dicarboxylic Acid

The dicarboxylic acid derived from renewable resources can be represented by compound (i):

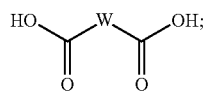

(i)

wherein each W independently is $(CH_2)_{1-8}$ or

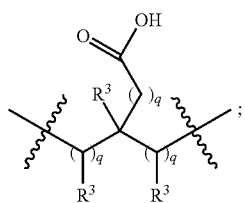

each $R^3$ independently is H or OH; and,
each q independently is 0-8.

Bio-Malonic Acid

In some embodiments, compound (i) is bio-malonic acid. In one route, bio-malonic acid can be produced by first oxidizing bio-ethylene in the presence of a silver catalyst to form bio-ethylene oxide, which undergoes hydroformylation to produce bio-3-hydroxypropionaldehyde. The bio-3-hydroxypropionaldehyde is hydrogenated to from bio-1,3-propanediol, which is oxidized using methods known to one skilled in the art to form bio-malonic acid.

In another route, the bio-1,3-propanediol can be produced through the fermentation of glycerol using *Clostridium* bacteria (e.g., *Clostridium diolis*). As previously described, glycerol can be obtained from fatty acids, fats, and oils.

In yet another route, the bio-1,3-propanediol can be produced through the conversion of corn syrup effected by a genetically modified strain of *E. coli*.

Bio-Succinic Acid

In some embodiments, compound (i) is bio-succinic acid. Bio-succinic acid is a by-product of sugar fermentation. It also can be produced by oxidizing bio-1,4-butanediol, according to methods known to one skilled in the art.

In one route, bio-ethylene is first converted to bio-acetylene. The bio-acetylene is reacted with two equivalents of bio-formaldehyde to form bio-1,4-butynediol, which is hydrogenated to produce bio-1,4-butanediol. Bio-formaldehyde can be produced through the catalytic oxidation of bio-methanol using silver metal or a mixture of iron and molybdenum or vanadium oxides.

In another route, bio-propylene oxide or bio-propanol is converted to bio-allyl alcohol by isomerization or dehydration, respectively. The bio-allyl alcohol is hydroformylated to form bio-4-hydroxybutyraldehyde, which is reduced to bio-1,4-butanediol. The bio-propylene oxide can be synthesized by the oxidation of bio-propylene using $H_2O_2$, or by converting bio-propylene to bio-1-chloro-2-propanol and bio-2-chloro-1-propanol using chlorine and water, and then reacting the bio-chloropropanols with hydroxide to form bio-propylene oxide.

In yet another route, the bio-1,4-butanediol can be produced through the metabolization of sugar by a genetically modified strain of *E. coli*.

Bio-Glutaric Acid

In some embodiments, compound (i) is bio-glutaric acid. Bio-glutaric acid can be produced by the ring opening of bio-butyrolactone using potassium bio-cyanide to result in potassium bio-carboxylate-nitrile, which is hydrolyzed to bio-glutaric acid. Potassium bio-cyanide can be produced from the reaction of KOH with bio-hydrogen cyanide. Bio-hydrogen cyanide can be produced by reacting bio-methane with ammonia. Bio-butyrolactone can be produced by removing water from bio-γ-hydroxybutryic acid, which can be produced from bio-1,4-butanediol.

In another route, bio-glutaric acid is produced by reacting bio-1,3-dibromopropane with bio-sodium or bio-potassium cyanide to form the bio-dinitrile, which can undergo hydrolysis to form bio-glutaric acid. The bio-1,3-dibromopropane can be formed by free radical addition between bio-allyl bromide with HBr.

Bio-Adipic Acid

In some embodiments, compound (i) is bio-adipic acid. Bio-adipic acid can be produced from the oxidation of fats, using methods known to one skilled in the art. Bio-adipic acid can also be produced through the carbonylation of bio-butadiene using two equivalents of carbon dioxide and two equivalents of water. Bio-butadiene can be produced from bio-ethanol either using a metal oxide catalyst in a one-step process at 400-450° C., or oxidizing the bio-ethanol to bio-acetaldehyde, which reacts with additional bio-ethanol over a tantalum-promoted porous silica catalyst at 325° C. to 350° C.

Bio-Pimelic Acid, Bio-Suberic Acid, and Bio-Azelaic Acid

In some embodiments, compound (i) is bio-pimelic acid, bio-suberic acid, or bio-azelaic acid, all of which can be produced from the oxidation of fats produced from ricinoleic acid, which can be obtained from castor oil. In some embodiments, the double bond of ricinoleic acid is split into bio-suberic acid and bio-azelaic acid. Bio-azelaic acid also can be produced from the oxidation of oleic acid with potassium permanganate, or the oxidative cleavage of oleic acid with chromic acid or using ozonolysis.

Bio-Sebacic Acid

In some embodiments, compound (i) is bio-sebacic acid. Bio-sebacic acid can be isolated from beef tallow. Bio-sebacic acid can also be produced by the treatment of ricinoleic acid with sodium hydroxide, as described in U.S. Patent Application Publication No. 2010/0151241, incorporated herein by reference.

Bio-Citric Acid and Bio-Isocitric Acid

In some embodiments, compound (i) is bio-citric acid or bio-isocitric acid, both of which are naturally occurring tricarboxylic acids.

Bio-Propane-1,2,3-Tricarboxylic Acid

In some embodiments, compound (i) is bio-propane-1,2,3-tricarboxylic acid. Bio-propane-1,2,3-tricarboxylic acid is naturally occurring. It can also be produced from bio-fumaric acid in two steps. Bio-fumaric acid can be produced from bio-succinic acid.

B. Polyalkylene Polyamine

The polyalkylene polyamine derived from renewable resources can be represented by compound (ii):

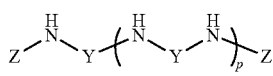

(ii)

wherein each Y independently is $(CH_2)_{1-8}$ or

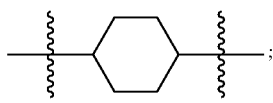

each Z independently is H or

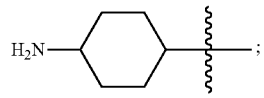

and
p is 1-8.

Bio-Diethylenetriamine, Bio-Triethylenetetramine, Bio-Tetraethylenepentamine

In some embodiments, compound (ii) is bio-diethylenetriamine, bio-triethylenetetramine, bio-tetraethylenepentamine, or a mixture thereof. In one route, bio-diethylenetriamine, biotriethylenetetramine, and bio-tetraethylenepentamine can be produced by reacting bio-dichloroethane with ammonia. Bio-dichloroethane can be produced by chlorinating bio-ethylene.

In another route, bio-diethylenetriamine, bio-triethylenetetramine, and bio-tetraethylenepentamine can be produced by reacting bio-monoethanolamine with ammonia. Bio-monoethanolamine can be produced by reacting bio-ethylene oxide with ammonia. Bio-ethylene oxide can be synthesized as previously described.

In yet another route, bio-diethylenetriamine, bio-triethylenetetramine, and bio-tetraethylenepentamine can be produced by reacting bio-diaminoethane with bio-monoethanolamine. Bio-diaminoethane can be synthesized through the reaction of bio-ethylene glycol, or bio-dichloroethane, or bio-monoethanolamine with ammonia.

Bio-Dipropylenetriamine

In some embodiments, compound (ii) is bio-dipropylenetriamine. Bio-dipropylenetriamine can be produce by reacting bio-1,3-dichloropropane with ammonia. Bio-1,3-dichloropropane can be synthesized by chlorinating bio-propylene to form bio-1,3-dichloropropene, and then reducing the bio-1,3-dichloropropene.

In another route, bio-dipropylenetriamine can be prepared by reacting bio-3-aminopropanol with ammonia. Bio-3-aminopropanol can be synthesized by reacting bio-acrylonitrile with water. Bio-acrylonitrile can be prepared by reacting bio-propylene with ammonia and molecular oxygen.

In yet another route, bio-dipropylenetriamine can be prepared by reacting bio-acrylonitrile with ammonia to form bio-1,3-propanediamine, and then reacting the bio-1,3-propanediamine with bio-monopropanolamine.

C. Bio-Epichlorhydrin

Bio-epichlorohydrin can be produced from bio-allyl chloride. Bio-allyl chloride can be produced by reacting bio-propylene with chlorine at high temperature (e.g., 500° C.) with the release of hydrochloric acid. In one route, bio-allyl chloride is hydrochlorinated using hypochlorus acid to form a mixture of 2,3-dichloro-1-propanol and 1,3-dichloro-2-propanol. Sodium hydroxide is added to this mixture to produce bio-epichlorohydrin, sodium chloride, and water. In another route, bio-allyl chloride is hypochlorinated in a dilute, aqueous chlorine solution to form the bio-dichlorohydrins, which are then dehydrochlorinated using either calcium hydroxide or sodium hydroxide to form bio-ephichlorohydrin. In yet another route, bio-allyl chloride is epoxidated using aqueous hydrogen peroxide and a heteropolyphosphatotungstate catalyst to yield bio-epichlorohydrin.

Bio-epichlorohydrin also can be produced from bio-allyl alcohol by reacting the bio-allyl alcohol with chlorine and calcium hydroxide, as previously described. Bio-allyl alcohol can be produced by the hydrolysis of bio-allyl chloride, or by the isomerization of bio-propylene oxide using a potassium alum catalyst at high temperatures. Bio-allyl alcohol also can be produced through the acetoxylation of bio-propene to form bio-allyl acetate, which can be hydrolyzed to yield bio-allyl alcohol. Bio-allyl alcohol also can be produced by oxidizing bio-propylene to bio-acrolein, and then hydrogenating the bio-acrolein to form bio-allyl alcohol.

Assessment of the Biobased Content of Materials

A suitable method to assess materials derived from renewable resources is through ASTM D6866, which allows the determination of the biobased content of materials using radiocarbon analysis by accelerator mass spectrometry, liquid scintillation counting, and isotope mass spectrometry. When nitrogen in the atmosphere is struck by an ultraviolet light produced neutron, it loses a proton and forms carbon that has a molecular weight of 14, which is radioactive. This $^{14}C$ is immediately oxidized into carbon dioxide, which represents a small, but measurable fraction of atmospheric carbon. Atmospheric carbon dioxide is cycled by green plants to make organic molecules during the process known as photosynthesis. The cycle is completed when the green plants or other forms of life metabolize the organic molecules producing carbon dioxide, which causes the release of carbon dioxide back to the atmosphere. Virtually all forms of life on Earth depend on this green plant production of organic molecules to produce the chemical energy that facilitates growth and reproduction. Therefore, the $^{14}C$ that exists in the atmosphere becomes part of all life forms and their biological products. These renewably based organic molecules that biodegrade to carbon dioxide do not contribute to global warming because no net increase of carbon is emitted to the atmosphere. In contrast, fossil fuel-based carbon does not have the signature radiocarbon ratio of atmospheric carbon dioxide. See WO 2009/155086, incorporated herein by reference.

The application of ASTM D6866 to derive a "biobased content" is built on the same concepts as radiocarbon dating, but without use of the age equations. The analysis is performed by deriving a ratio of the amount of radiocarbon ($^{14}C$) in an unknown sample to that of a modern reference standard. The ratio is reported as a percentage with the units "pMC" (percent modern carbon). If the material being analyzed is a mixture of present day radiocarbon and fossil carbon (containing no radiocarbon), then the pMC value obtained correlates directly to the amount of biomass material present in the sample.

The modern reference standard used in radiocarbon dating is a NIST (National Institute of Standards and Technology) standard with a known radiocarbon content equivalent approximately to the year AD 1950. The year AD 1950 was chosen because it represented a time prior to thermo-nuclear weapons testing, which introduced large amounts of excess radiocarbon into the atmosphere with each explosion (termed "bomb carbon"). The AD 1950 reference represents 100 pMC.

"Bomb carbon" in the atmosphere reached almost twice normal levels in 1963 at the peak of testing and prior to the treaty halting the testing. Its distribution within the atmosphere has been approximated since its appearance, showing values that are greater than 100 pMC for plants and animals living since AD 1950. The distribution of bomb carbon has gradually decreased over time, with today's value being near 107.5 pMC. As a result, a fresh biomass material, such as corn, could result in a radiocarbon signature near 107.5 pMC.

Petroleum-based carbon does not have the signature radiocarbon ratio of atmospheric carbon dioxide. Research has noted that fossil fuels and petrochemicals have less than about 1 pMC, and typically less than about 0.1 pMC, for example, less than about 0.03 pMC. However, compounds derived entirely from renewable resources have at least about 95 percent modern carbon (pMC), preferably at least about 99 pMC, for example, about 100 pMC.

Combining fossil carbon with present day carbon into a material will result in a dilution of the present day pMC content. By presuming that 107.5 pMC represents present day biomass materials and 0 pMC represents petroleum derivatives, the measured pMC value for that material will reflect the proportions of the two component types. A material derived 100% from present day soybeans would give a radiocarbon signature near 107.5 pMC. If that material was diluted with 50% petroleum derivatives, it would give a radiocarbon signature near 54 pMC.

A biobased content result is derived by assigning 100% equal to 107.5 pMC and 0% equal to 0 pMC. In this regard, a sample measuring 99 pMC will give an equivalent biobased content result of 93%.

Assessment of the materials described herein were done in accordance with ASTM D6866, particularly with Method B. The mean values quoted in this report encompasses an absolute range of 6% (plus and minus 3% on either side of the biobased content value) to account for variations in end-component radiocarbon signatures. It is presumed that all materials are present day or fossil in origin and that the desired result is the amount of biobased component "present" in the material, not the amount of biobased material "used" in the manufacturing process.

Other techniques for assessing the biobased content of materials are described in U.S. Pat. Nos. 3,885,155, 4,427,884, 4,973,841, 5,438,194, and 5,661,299, and WO 2009/155086, each incorporated herein by reference.

Method of Making Wet Strength Resin

The polymers of Formula I can be prepared by condensing a polyalkylene amine with a dicarboxylic acid, or any active derivative thereof, to form a polyamide, and then reacting the polyamide with epichlorohydrin, as described in, e.g., U.S. Pat. No. 2,926,154.

Condensation of the Polyalkylene Amide with the Dicarboxylic Acid

The condensation of the polyalkylene amine with the dicarboxylic acid to form the polyamide of the invention can occur by any method known to one skilled in the art, and the reaction parameters used for this condensation reaction depend on the exact reaction conditions, as understood to one skilled in the art. For example, the reaction temperature can be about 110° C. to about 250° C. or higher at atmospheric pressure, preferably about 160° C. to about 210° C. Under reduced pressure conditions, the temperature of the condensation also can be reduced accordingly. The reaction time depends on the exact reaction conditions and occurs until a substantial amount of starting materials have been converted to polyamide, e.g., about 30 minutes to about 2 hours.

The amount of dicarboxylic acid used should be sufficient to react with substantially all of the primary amine groups of the polyalkylene polyamine, but insufficient to react with the secondary amine groups of the polyalkylene polyamine. For example, the ratio of dicarboxylic acid to polyalkylene amine can be about 0.8:1 to about 1.4:1, preferably about 0.9:1 to about 1.2:1, more preferably about 0.92:1 to about 1.14:1. Ratios below about 0.8:1 result in a gelled product, while ratios above about 1.4:1 result in low molecular weight polyamides. The composition of the polyamide polymer and the ratio of dicarboxylic acid to polyalkylene amine in the polymer can be determined using nuclear magnetic resonance and gas chromatography, and by other characterization methods known to one skilled in the art.

The molecular weight of the polyalkylene amide can be about 5,000 to about 30,000, for example, about 10,000. "Molecular weight" as used herein means "weight average molecular weight." "Weight average molecular weight" means the weight average molecular weight as determined using gel permeation chromatography according to the protocol found in Colloids and Surfaces A. Physico Chemical & Engineering Aspects, Vol. 162, 2000, pg. 107-121.

Functionalization of Polyamide with Epichlorohydrin

The polyamide can be functionalized with epichlorohydrin by any method known to one skilled in the art, and the reaction parameters used for this functionalization depend on the exact reaction conditions, as understood to one skilled in the art. In some embodiments, the reaction can occur in an aqueous solution. Optionally, base can be added to the reaction solution to neutralize some of the acid that forms during the previous polymerization reaction.

For example, the epichlorohydrin can be reacted with the polyamide at a temperature of about 45° C. to about 100° C., preferably about 45° C. to about 70° C., until the viscosity of a 20% solids solution at 25° C. has reached about C or higher on the Gardner-Holdt scale. After the reaction solution reaches the desired viscosity, sufficient water is added to adjust the solids content of the solution to about 15% or less. The product is cooled to about 25° C., and then stabilized by adding sufficient acid (e.g., hydrochloric acid, sulfuric acid, nitric acid, formic acid, phosphoric acid, acetic acid) to reduce the pH to at least about 6, preferably to at least about 5.

In the polyamide-epichlorohydrin reaction, sufficient epichlorohydrin should be used to convert all secondary amide groups to tertiary amine groups and/or quaternary ammonium groups, including cyclic structures. However, more or less epichlorohydrin can be added to the polyamide to moderate or increase reaction rates. For example, about 0.5 mol to about 1.8 mol, preferably about 0.9 mol to about 1.5 mol, of epichlorohydrin per mole of polyamide secondary amine is contemplated.

The composition of the polyaminoamide epichlorohydrin resin and the amount of epichlorohydrin functionalization on the polyamide can be determined using nuclear magnetic resonance, gas chromatorgraphy, and by other characterization methods known to one skilled in the art.

The molecular weight of the polyaminoamide epichlorohydrin resin can be can be about 5,000 to about 30,000, for example, about 10,000. "Molecular weight" as used herein means "weight average molecular weight." "Weight average molecular weight" means the weight average molecular weight as determined using gel permeation chromatography according to the protocol found in Colloids and Surfaces A. Physico Chemical & Engineering Aspects, Vol. 162, 2000, pg. 107-121.

Paper Article Comprised of Wet Strength Resins Derived From Renewable Resources

The invention also relates to a paper article comprising the polymer of Formula I, as previously described herein. The paper article can be any paper that used for absorbent purposes (e.g., a towel, a facial tissue, a sanitary tissue, and paperboard. Nonlimiting examples of paper articles include bath towels, facial tissue, industrial wipers, Kleenex, kraft paper, napkins, paper coveralls, plates, tablecloth covers, toilet seat covers, towels, white butcher paper, C-fold towers, household towels, multi-fold towels, roll towels, single fold towels. Additional examples of paper articles include airmail papers, artboards, artists papers, baking paper, blotting papers, book binding materials, book cover material, book end papers, book papers, bookjacket papers, bulky book papers, business papers, carbonless papers, carbonless reels, carbonless sheets, cardstock, cartonboards, cast coated papers, check papers, cigarette papers, colored papers, copier papers, copier/laser paper, corrugating medium, cover papers, cupstock, diazo paper, digital papers, directory papers, display boards, document/presentation papers, drawing office papers, duplicator papers, electrical application papers, embossed papers & boards, envelope papers, manila envelope papers, facsimile paper, filter papers, fluorescent papers & boards, folding boxboard, forest stewardship council (FSC) Papers, glassine papers, graphical boards, greaseproof papers, grey board, gummed papers, handmade papers & boards, inkjet papers, ivory boards, ivory papers, Kraft boards, Kraft lined chip, Kraft papers, Kraftliner, label papers, label papers (coated), label papers (uncoated), laid papers, laminates, laser printing papers (not copier), letter file, liquid packaging board, listing papers, long life papers & boards, lightweight coated paper (LWC), manila boards, manila envelopes, medical papers, metallized papers & boards, machine-finished (MF) papers, machine glazed (MG) bleached papers, MG papers, mini web reels, multi-layer boards, medium weight coated (MWC) papers, near wood-free papers & boards, newsprint, recycled newsprint, OCR papers, offset papers, on-machine coated papers & boards, one-time carbon, packaging boards, packaging papers, part mechanical papers & boards, pen plotter & map papers, poster papers, preprint papers, pressboards, pulpboard, rag bank & bond papers, real art papers & boards, recycled boards, recycled coated paper & board, recycled graph.board (100% PCW), recycled graph.board(<100% PCW), recycled graph.paper(<100% PCW), recycled graphical paper (100% PCW), recycled papers, release papers, sack and Kraft Paper, SC gravure, SC offset, security papers, self-adhesive base papers, self-adhesive papers, silicone papers, solid bleached board, special coated paper, special surface papers & boards, stamp papers, stationery, synthetic papers, tag papers & boards, testliner, textured papers & boards, thermal paper, thermal transfer papers, thin opaques/bible papers, ticket boards, tissue, translucent paper, tube papers & boards, ULWC, uncoated mechanical papers, vegetable parchment, wallpaper base, watermarked papers, web Offset reels, wet strength papers, WF bulky coated papers & boards, WF envelope/cartridge, WF gloss coated papers & boards, WF gloss coated for dig.print, WF matt coated papers & boards, WF matt coated for dig.print, WF one side coated papers & boards, WF satin coated papers & boards, WF silk coated papers & boards, WF uncoated papers & boards, white lined chipboard, and wove papers.

The paper article of the invention includes a natural fiber, a synthetic fiber, or a mixture thereof having a length of about 0.8 mm to about 5 mm. If the fiber is less than about 0.8 mm, the fiber can break apart during manufacturing. If the fiber is greater than about 5 mm, the fiber can aggregate during manufacturing to cause clumps in the resulting paper article.

In some embodiments, the natural fiber is from a hardwood source, such as, for example, oak, maple, and eucalyptus. In some embodiments when the fiber is from a hardwood source, the fiber is about 0.8 mm to about 2 mm long. In some embodiments, the natural fiber is from a softwood source, such as, for example, pine, aspen, and birch. In some embodiments when the fiber is from a softwood source, the fiber is about 2 mm to about 5 mm long. In some embodiments, the fiber is synthetic, such as, for example, a polyolefin, a polyester, or a cellulosic fiber (e.g., cellulose acetate and/or rayon).

The paper article of the invention can further include one or more additives commonly used in papermaking. Nonlimiting examples of useful additives include additional wet strength agents (e.g., urea-formaldehyde resins, melamine formaldehyde resins, polyethyleneimine resins, polyacrylamide resins, polyvinylamine resins, dialdehyde starches, and derivatives thereof), dry strength additives (e.g., polysalt coacervates rendered water soluble by the inclusion of ionization suppressors, carboxylmethyl cellulose), debonders, which increase the softness of the paper webs (e.g., quaternary ammonium chlorides such as ditallowedimethyl ammonium chloride and bis(alkoxy-(2-hydroxy)propylene) quaternary ammonium compounds), pigments, dyes, fluorescers, and the like. In some embodiments when the paper article of the invention includes carboxymethyl cellulose (CMC), the CMC acts synergistically with the wet strength resin of the invention and is present in an amount of about 0.1 wt. % to about 0.2 wt. % for every 1 wt. % of wet strength resin.

The paper article of the invention can be single ply or multiple-ply (e.g., 2-ply, 3-ply, 4-ply, 5-ply, or 6-ply). It has a dry strength of about 300 g/in per ply to about 2000 g/in per ply, preferably about 500 g/in per ply to about 1500 g/in per ply, more preferably about 700 g/in per ply to about 1200 g/in per ply, and a wet strength of about 60 g/in per ply to about 300 g/in per ply, preferably about 100 g/in per ply to about 300 g/in per ply, more preferably about 140 g/in per ply to about 240 g/in per ply. The paper article of the invention has a wet/dry tensile ratio of about 10% to about 30%, preferably about 15% to about 25%, for example, about 20%. The basis weight of the paper article of the invention is about 10 pounds per 30,000 square feet (lbs/30,000 ft$^2$) to about 30 lbs/30,000 ft$^2$, for example, about 15 lbs/30,000 ft$^2$ to about 28 lbs/30,000 ft$^2$. The wet strength of the paper article of the invention can be determined by methods known to one skilled in the art, such as a suitable ASTM method. The dry strength of the paper article of the invention can be determined by methods known to one skilled in the art, such as a suitable ASTM method. The wet/dry tensile ratio of the paper article of the invention can be determined by methods known to one skilled in the art, such as a suitable ASTM method. The basis weight of the paper article of the invention can be determined by methods known to one skilled in the art, such as a suitable ASTM method.

The paper article of the invention can be formed by any method known to one skilled in the art. For example, a five step process for the formation of the paper of invention is described below (see, e.g., U.S. Pat. No. 4,637,859, incorporated herein by reference).

In the first step, an aqueous dispersion of papermaking fibers and the polymer of Formula I is provided. Papermaking fibers useful in the present invention include bleached or unbleached cellulosic fibers commonly known as wood pulp fibers. Fibers derived from soft woods (gymnosperms or coniferous trees) and hard woods (angiosperms or deciduous trees) are contemplated for use in this invention. The wood pulp fibers can be produced from native wood by any pulping process known to one skilled in the art. Chemical processes (e.g., sulfite, sulphate, soda processes), mechanical processes (e.g., thermochemical), semi-chemical, and semi-mechanical processes are suitable. Preferably, when the paper web of this invention is intended for use in absorbent products such as paper towels, bleached northern softwood Kraft pulp fibers are preferred. In addition to the various wood pulp fibers, other cellulosic fibers such as cotton linters, rayon, and bagasse can be used in this invention. Synthetic fibers such as polyester and polyolefin fibers can also be used and, in fact, are preferred in certain applications.

The second step includes forming an embryonic web of papermaking fibers from the aqueous dispersion provided in the first step. Any equipment commonly used in the art for dispersing fibers is appropriate. The fibers are normally dispersed at a consistency of about 0.1% to about 0.3% at the time an embryonic web is formed. Percent consistency is defined as 100 times the quotient obtained when the weight of dry fiber in the system under discussion is divided by the total weight of the system. An alternative method of expressing moisture content of a system sometimes used in the papermaking art is pounds of water per pound of fiber or, alternatively and equivalently, kilograms of water per kilogram of fiber. The correlation between the two methods of expressing moisture content can be readily developed. For example, a web having a consistency of 25%, 50%, or 70%, comprises 3, 1, and 0.33 kilograms of water per kilogram of fiber, respectively. Fiber weight is always expressed on the basis of dry fibers.

The aqueous dispersion of papermaking fibers and embryonic web formed from the web can further include various additives commonly used in papermaking. Nonlimiting examples of useful additives include additional wet strength agents (e.g., urea-formaldehyde resins, melamine formaldehyde resins, polyethyleneimine resins, polyacrylamide resins, and dialdehyde starches), dry strength additives (e.g., polysalt coacervates rendered water soluble by the inclusion of ionization suppressors), debonders, which increase the softness of the paper webs (e.g., quaternary ammonium chlorides such as ditallowedimethyl ammonium chloride and bis(alkoxy-(2-hydroxy)propylene) quaternary ammonium compounds), pigments, dyes, fluorescers, and the like.

Complete descriptions of useful wet strength agents can be found in Tappi Monograph Series No. 29, Wet Strength in Paper and Paperboard, Technical Association of Pulp and Paper Industry (New York, 1965), incorporated herein by reference, and in other common references. Dry strength additives are described more fully in U.S. Pat. No. 3,660,338, incorporated herein by reference, and in other common references. The levels at which these materials are useful in paper webs is also described in the noted references. Specific debonders that can be used in the present invention are described in U.S. Pat. Nos. 3,554,863, 4,144,122, and 4,351,699, each incorporated herein by reference.

The resulting embryonic web is deposited onto a foraminous surface (i.e., the first foraminous member), and a portion of the aqueous dispersing medium is removed. As used herein, an "embryonic web" is a web of fibers that is subjected to rearrangement on a deflection member. The fibers in the embryonic web normally comprise a relatively large quantity of water with typical consistencies in the range of about 5% to about 25%, and is normally too weak to be capable of existing without the support of an extraneous element, such as a Fourdrinier wire. At the time the embryonic web is subjected to rearrangement on the deflection member, it must be held together by bonds weak enough to permit rearrangement of the fibers under the action of the deflection forces.

Any of the techniques known to those skilled in the papermaking art can be used to form the embryonic web, and the precise method by which the embryonic web is formed is immaterial to the practice of this invention. Although batch process, such as handsheet making processes, can be used, continuous papermaking processes are preferred. Examples of said processes are described, e.g., U.S. Pat. Nos. 3,301,746, and 3,994,771, each incorporated herein by reference.

The third step in the paper making process includes associating the embryonic web with a deflection member (i.e., the second foraminous member) to bring the embryonic web into contact with the deflection member on which it will be subsequently deflected, rearranged, and further dewatered. The deflection member can include any physical form known to one skilled in the art, such as an endless belt, a stationary plate for use in making handsheets, or a rotating drum.

The deflection member must be foraminous. As used herein, "foraminous" is defined as possessing continuous passages connecting a first surface (i.e., upper surface, working surface, the surface with which the embryonic web is associated) with a second surface (i.e., lower surface). The deflection member is constructed in such a manner that, when water removal from the embryonic web occurs, it can be discharged from the system in the direction of the foraminous member without having to again contact the embryonic web in either the liquid or the vapor state. Water removal can occur by application of differential fluid pressure The embryonic web-contacting surface of the deflection member can also include a macroscopically monoplanar, patterned, continuous network surface, which defines within the deflection member a plurality of discrete, isolated, deflection conduits. When a portion of the embryonic web-contacting surface of the deflection member is placed into a planar configuration, the network surface is essentially monoplanar, meaning that deviations from absolute planarity are tolerable, but not preferred, as long as the deviations are not substantial enough to adversely affect the performance of the product formed on the deflection member. The network surface is said to be "continuous" because the lines formed by the network surface form at least one essentially unbroken net-like pattern. The pattern is said to be "essentially" continuous because interruptions in the pattern are tolerable, but not preferred, as long as the interruptions are not substantial enough to adversely affect the performance of the product made on the deflection member. The deflection conduits are discrete and have a finite shape that depends on the pattern selected for the network surface. The deflection conduits are isolated because there is no connection within the body of the deflection member between one deflection conduit and another. Thus, transfer of material from one deflection conduit to another is not possible unless the transfer is effected outside the body of the deflection member. An infinite variety of geometries for the network surface and the openings of the deflection conduits are possible, and guidelines for selecting a particular geometry are described in U.S. Pat. No. 4,637,859.

The fourth step involves deflecting the fibers in the embryonic web into the deflection conduits and removing water from the embryonic web, e.g., by the application of differential fluid pressure to the embryonic web, to form an intermediate web of papermaking fibers. The deflecting is effected under such conditions that there is essentially no water removal from the embryonic web through the deflection conduits after the embryonic web has been associated with the deflection member prior to the deflecting of the fibers into the deflection conduits. At the time the fibers are deflected into the deflection conduits or after such deflection, water removal from the embryonic web and through the deflection conduits begins. The third and fourth steps essentially can be accomplished simultaneously through the use of a technique analogous to the wet-microcontraction process used in papermaking. The water removal that occurs both during and after deflection results in a decrease in fiber mobility in the embryonic web, which tends to fix the fibers in place after they have been deflected and rearranged.

The fifth step includes drying the intermediate web to form the paper article of the invention. Any means known to one in the papermaking art can be used to dry the intermediate web. For example, flow-through dryers and Yankee dryers, alone and in combination, are satisfactory. Optionally, a predryer can be used.

Optionally, but preferably, the dried article is foreshortened following the first step of the paper making process. As used herein, "foreshortening" refers to the reduction in length of a dry paper web which occurs when energy is applied to the dry web to reduce the length of the web and to rearrange the fibers with an accompanying disruption of fiber-fiber bonds. Foreshortening can be accomplished in any of several well-known ways, such as creping (i.e., adhering the dried web to a surface and then removing it from that surface with a doctor blade). Other techniques for foreshortening paper webs include subjecting the web to compaction between a hard surface and a relatively elastic surface, as described in U.S. Pat. Nos. 2,624, 245, 3,011,545, 3,329,556, 3,359,156, and 3,630,837, each of which are incorporated herein by reference, and microcreping, as described in U.S. Pat. Nos. 3,260,778, 3,416,192, 3,426,405, and 4,090,385, each of which are incorporated herein by reference.

EXAMPLE

Example 1

Preparation of Bio-Polyaminoamide Epichlorohydrin

About 225 g (2.18 mol) of bio-diethylenetriamine and 100 grams of water is placed in a 3-necked flask equipped with a mechanical stirrer, thermometer, and condenser. To this is added 290 grams (2.0 mol) of bio-adipic acid. After the acid has dissolved in the amine, the solution is heated to 185-200° C. and held there for 1.5 hours. Then, vacuum from a water pump is applied to the flask during the period required for the contents of the flask to cool to 140° C. following which 430 grams of water is added. The bio-polyamide solution contains 52.3% solids and had an acid number of 2.1.

To 60 grams of this bio-polyamide solution in a round bottom flask is added 225 grams of water. This solution is heated to 50° C. and 12.5 grams of bio-epichlorohydrin is added dropwise over a period of 11 minutes. The contents of the flask are then heated to 60-70° C. until it has attained a Gardner viscosity of greater than E. Then 150 grams of water is added to the product, and it is cooled to 25° C. Eleven mL of 10% HCl is then added to adjust the pH to 5.0. The product contains 9.0% solids and has a Gardner viscosity of C-D.

Example 2

Handsheet Preparation

Northern softwood kraft (NSK) dry lap is repulped by soaking in distilled water (25 bond dry grams (BDG) in about 500 mL of water for 1 hour at ambient conditions). The slurry is added to a Tappi beaker that contains about 1500 mL of tap water pretreated with sodium thiosulfate antichlor (0.5 mL of a stock solution containing 86 g/L $Na_2S_2O_3$ required at 1 ppm $AvCl_2$). The pulp slurry disintegrates in about 10 minutes. The slurry is then added to 17 L of dechlorinated tap water in a proportioner. A weigh sheet is then formed using 2.543 L of well-mixed slurry (1.3% consistency). This slurry is added to a deckle box, which contains 54 mL of dechlorinated tap water (giving 0.04% consistency). Formation is effected via vacuum filtration through a wire. The wet sheet is passed over a vacuum slit (2×) and a drum dryer (3×). The proportioner pulp consistency is then adjusted to 1.0%, based on the bone dry weight of the sheet. The solution pH is adjusted as desired (e.g., pH 8) in both the proportioner and the decide box. The Pulp Filtration Rate (PFR) is then measured by methods known to one skilled in the art. A solution of polyaminoamide epichlorohydrin from Example 1 (69.57 g of a 0.2% solution based on solids) is added to the proportioner and allowed to mix for about 5 minutes. The resulting 6 handsheets are placed in a 105° C. oven for 5 min.

The handsheets are characterized by methods known to one skilled in the art. Tensile strength is measured on 1"×4" sections using a Model 1122 Instron controlled by a Hewlett-Packard 86B computer. Handsheet caliper is measured using a Thwing-Albert VIR Electronic Thickness Tester. Wet burst is evaluated using a Thwing-Albert Burst Tester. A 4" square handsheet section is soaked briefly in distilled water prior to obtaining wet burst values. All handsheets are equilibrated in a constant temperature-humidity room for 24 hours prior to testing.

Nitrogen levels in handsheets are determined by Kjeldahl analysis performed at either Huffman Laboratories (Wheatridge, Colo.) or Hazleton Laboratories (Madison, Wis.). The latter typically provided "micro-Kjeldahl" analyses. Nitrogen levels are related to the level of polyaminoamide epichlorohydrin from Example 1 by assuming an elemental nitrogen content of 12.8% in the polyaminoamide epichlorohydrin.

A fully extended polymer of Example 1 monomer unit has an estimated surface area of 50 Å$^2$ (based on Pauling interatomic distances). The maximum surface area for 0.01 g of fully extended polymer from Example 1 is calculated according to the following equation: 50 Å$^2$×0.01 g/270 g/mol×1 m$^2$/10×10$^{2\circ}$ Å$^2$×6.02×10$^{23}$ molecules/mole m$^2$/0.01 g, which expresses the potential surface area coverage of the polymer of Example 1 at 1% usage. One gram of unbeaten pulp has a surface area of about 1 m$^2$ accessible to a dye of surface area 141 Å$^2$. This increases to about 7 m$^2$ upon beating to the point where tensile levels off (about pfr 10).

Example 3

Paper Preparation

A pilot scale papermaking machine is obtained. The headbox is a fixed roof suction breast roll former and the Fourdinier wire is 33 by 30 (filaments per centimeter) five-shed. The furnish comprises 100% northern softwood Kraft pulp fibers with about 4 kilograms of the wet strength resin from Example 1 per 1000 kg bone dry fibers. The deflection member is an endless belt and is formed about a foraminous woven element made of polyester and having 17 (MD) by 18 (CD) filaments per centimeter in a simple (2S) weave. Each filament is 0.18 mm in diameter; the fabric caliper is 0.42 mm and it has an open area of about 47%. The deflection member is about 1.1 mm thick. The blow-through predryer operates at a temperature of about 93° C. The Yankee drum dryer rotates with a surface speed of about 244 meters (800 feet) per minute. The paper web is wound on a reel at a surface speed of 195 meters (640 feet) per minute. The consistency of the embryonic web at the time of transfer from the Fourdinier wire to the deflection member is about 10%; and the consistency of the predried web at the time of impression of the continuous network surface into the web by the impression nip roll against the surface of the Yankee dryer is between about 60% and about 70%. The imprinted web is adhered to the surface of the Yankee dryer with polyvinyl alcohol adhesive and is creped therefrom with a doctor blade having an 81° angle of impact.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is, intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed:

1. A polymer of Formula I:

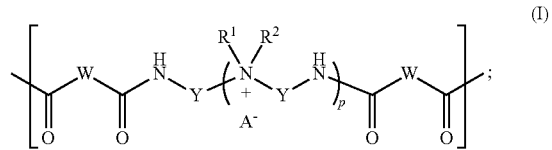

wherein A is Cl, Br, OH, NO$_3$, or BF$_4$;
each W independently is (CH$_2$)$_{1-8}$ or

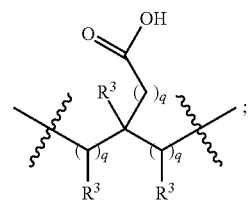

each Y independently is (CH$_2$)$_{1-8}$ or

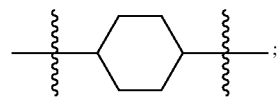

each R$^1$ independently is H,

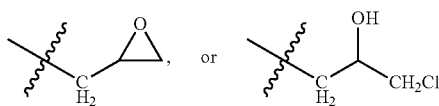

and each R$^2$ is H; or R$^1$ and R$^2$ together with the nitrogen to which they are attached form

[Structure: 3-hydroxyazetidinium]

with the proviso that about 20 mole percent to about 40 mole percent of $R^1$ are H;
each $R^3$ independently is H or OH;
p is 1-8;
each q independently is 0-8;
wherein the molar ratio of W to Y is about 0.8:1 to about 1.4:1; and,
wherein at least one of W, Y, and Formula I has a biobased content of at least about 95%.

2. The polymer of claim 1, wherein the biobased content is at least about 97%.

3. The polymer of claim 2, wherein the biobased content is at least about 99%.

4. The polymer of claim 1, wherein each W independently is $(CH_2)_{1-8}$, each Y independently is $(CH_2)_{1-8}$, and p is 1-3.

5. The polymer of claim 4, wherein each W independently is $(CH_2)_{2-4}$, and each Y independently is $(CH_2)_{2-4}$.

6. The polymer of claim 5, wherein A is Cl, each W independently is $(CH_2)_4$, each Y independently is $(CH_2)_2$, and p is 1.

7. A method for synthesizing the polymer of claim 1, the method comprising:
(a) reacting:
(i)

[Structure: HO-C(=O)-W-C(=O)-OH]

and,
(ii)

[Structure: Z-NH-Y-(NH-Y)$_p$-NH-Z]

to form

[Structure: polymer with repeating unit containing W, Y, NH groups]

and,
(b) functionalizing the product from step (a) with

[Structure: epichlorohydrin Cl-CH$_2$-epoxide]

to form the polymer of claim 1;
wherein each W independently is $(CH_2)_{1-8}$ or

[Structure: branched with $R^3$, $(CH_2)_q$, COOH]

each Y independently is $(CH_2)_{1-8}$ or

[Structure: cyclohexylene]

each Z independently is H or

[Structure: H$_2$N-cyclohexyl]

each $R^3$ independently is H or OH;
p is 1-8;
each q independently is 0-8; and,
the molar ratio of W to Y is about 0.8:1 to about 1.4:1 and wherein at least one of (i), (ii), (iii), W, and Y has a biobased content of at least about 95%.

8. The method of claim 7, wherein the biobased content is at least about 97%.

9. The method of claim 8, wherein the biobased content is at least about 99%.

10. A paper article comprising a polymer of Formula I:

$$[-C(=O)-W-C(=O)-NH-Y-(N^+(R^1)(R^2)-Y)_p-NH-]\quad A^-\qquad (I)$$

wherein A is Cl, Br, OH, $NO_3$, or $BF_4$;
each W independently is $(CH_2)_{1-8}$ or

[Structure: branched with $R^3$, $(CH_2)_q$, COOH]

each Y independently is $(CH_2)_{1-8}$ or

[Structure: cyclohexylene]

each $R^1$ independently is H,

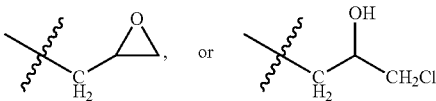

and each R² is H; or R¹ and R² together with the nitrogen to which they are attached form

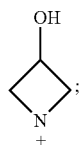

with the proviso that about 20 mole percent to about 40 mole percent of R¹ are H.

each R³ independently is H or OH;
p is 1-8;
each q independently is 0-8;
wherein the molar ratio of W to Y is about 0.8:1 to about 1.4:1; and,
wherein at least one of W, Y, and Formula I has a bio-based content of at least about 95%; and,
wherein the paper has a dry strength of about 300 g/in per ply to about 2000 g/in per ply, and a wet strength of about 60 g/in per ply to about 400 g/in per ply.

11. The article of claim 10, wherein the biobased content is at least about 97%.

12. The article of claim 11, wherein the biobased content is at least about 99%.

13. The article of claim 10, wherein each W independently is $(CH_2)_{1-8}$, each Y independently is $(CH_2)_{1-8}$, and p is 1-3.

14. The article of claim 13, wherein each W independently is $(CH_2)_{2-4}$, and each Y independently is $(CH_2)_{2-4}$.

15. The article of claim 14, wherein A is Cl, each W independently is $(CH_2)_4$, each Y independently is $(CH_2)_2$, and p is 1.

16. The article of claim 10, wherein the article comprises a natural fiber, a synthetic fiber, or a mixture thereof.

17. The article of claim 16, wherein the natural fiber is derived from a source selected from the group consisting of oak, maple, eucalyptus, pine, aspen, birch, and mixtures thereof.

18. The article of claim 16, wherein the synthetic fiber is selected from the group consisting of a polyolefin, a polyester, a cellulosic fiber, and mixtures thereof.

19. The article of claim 10 further comprising an additive selected from the group consisting of an additional wet strength resin, a dry strength resin, a debonder, a pigment, a dye, a fluorescer, and mixtures thereof.

20. The article of claim 10, wherein the article has a dry strength of about 500 g/in per ply to about 1500 g/in per ply, and a wet strength of about 100 g/in per ply to about 300 g/in per ply.

21. The article of claim 10, wherein the article comprises a basis weight of about 10 pounds per 30,000 square feet (lbs/30,000 ft²) to about 30 lbs/30,000 ft².

22. The article of claim 21, wherein the basis weight is about 15 lbs/30,000 ft² to about 28 lbs/30,000 ft².

23. The article of claim 10, wherein the article is single ply or multiple-ply.

24. The article of claim 10, wherein the article is selected from the group consisting of a towel, a tissue, and a paperboard.

* * * * *